(12) United States Patent
Mochida et al.

(10) Patent No.: US 7,732,956 B2
(45) Date of Patent: Jun. 8, 2010

(54) MOTOR

(75) Inventors: Takashi Mochida, Chiba (JP); Sachiko Kaneko, Chiba (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 12/051,326

(22) Filed: Mar. 19, 2008

(65) Prior Publication Data

US 2008/0238230 A1    Oct. 2, 2008

(30) Foreign Application Priority Data

Mar. 27, 2007    (JP)    ............................. 2007-082108

(51) Int. Cl.
*H02K 7/00*    (2006.01)
(52) U.S. Cl. ...................................... 310/67 R; 310/90
(58) Field of Classification Search ............... 310/67 R, 310/89–90, 51, 85–86
See application file for complete search history.

(56) References Cited

U.S. PATENT DOCUMENTS

| | | | |
|---|---|---|---|
| 5,357,162 A * | 10/1994 | Aiyoshizawa et al. ......... 310/90 |
| 6,443,716 B1 * | 9/2002 | Yoshioka .................. 417/423.7 |
| 6,774,520 B2 * | 8/2004 | Wauke .................... 310/156.45 |
| 2002/0089246 A1 * | 7/2002 | Wauke ....................... 310/67 R |
| 2002/0117910 A1 * | 8/2002 | Wauke ....................... 310/67 R |
| 2003/0197436 A1 * | 10/2003 | Takahashi ................. 310/67 R |
| 2005/0264121 A1 * | 12/2005 | Yajima et al. .......... 310/156.45 |
| 2006/0103248 A1 * | 5/2006 | Tamaoka ...................... 310/88 |
| 2006/0197395 A1 * | 9/2006 | Iguchi .................... 310/156.43 |

FOREIGN PATENT DOCUMENTS

JP    11-252878    9/1999

* cited by examiner

*Primary Examiner*—Thanh Lam
(74) *Attorney, Agent, or Firm*—Sonnenschein Nath & Rosenthal LLP

(57) ABSTRACT

A motor includes a shaft that serves as a rotation center when a rotor is rotated with respect to a stator, a bearing that supports the shaft in a circumferential direction of the shaft, a thrust bearing that supports one end of the shaft in a thrust direction of the shaft, a magnet that is fixed to the rotor and alternately magnetized to different poles in a rotational direction of the shaft, a core that is fixed to the stator and disposed to face the magnet in a radial direction of the shaft, a coil that are wound around the core, and a magnetic shield that shields leakage flux leaking from the magnet to the coil. A magnetic center of the core is offset from a magnetic center of the magnet in the thrust direction, so that the shaft is attracted to the thrust bearing.

10 Claims, 19 Drawing Sheets

WITHOUT MAGNETIC SHIELD

WITH MAGNETIC SHIELD

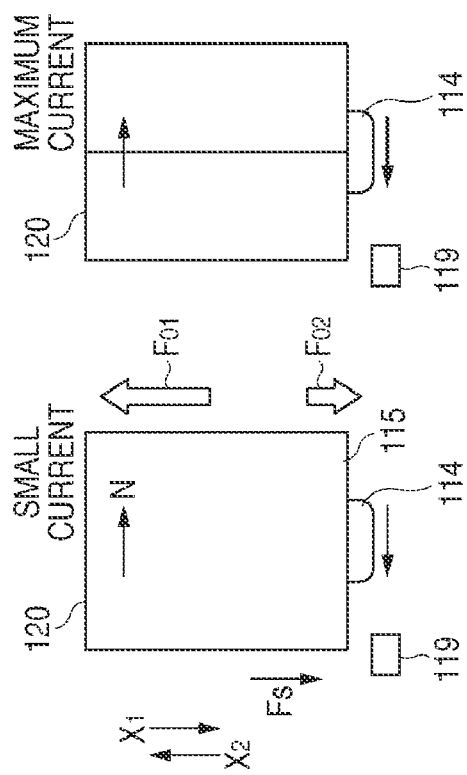

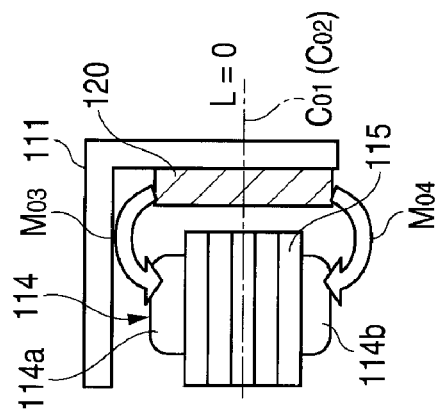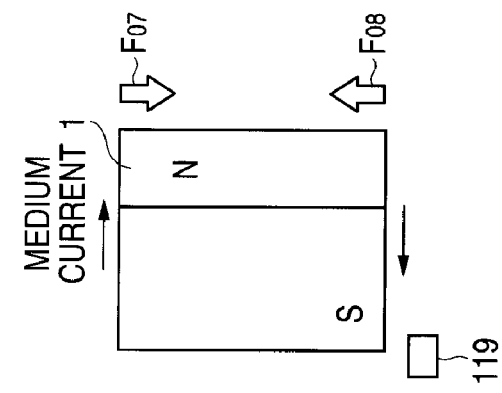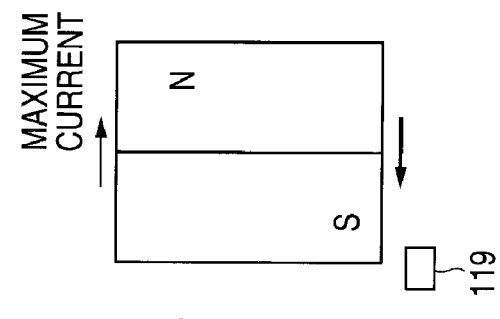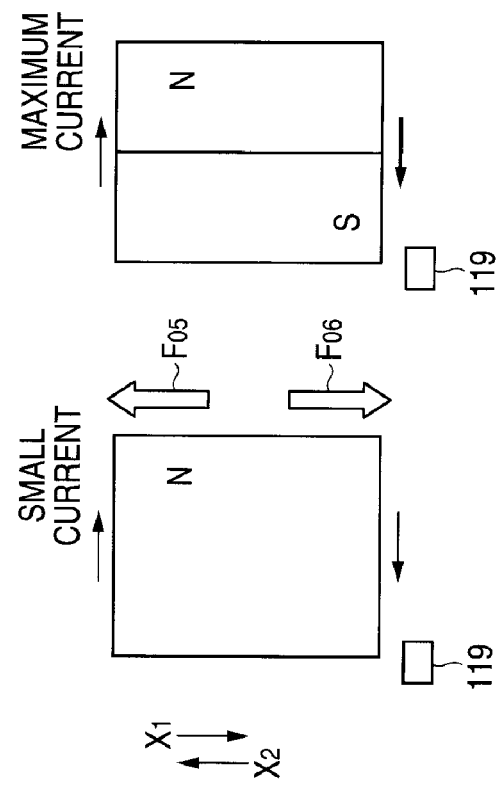

MOTOR

CROSS REFERENCES TO RELATED APPLICATION

The present invention contains subject matter related to Japanese Patent Application JP 2007-082108 filed in the Japanese Patent Office on Mar. 27, 2007, the entire contents of which being incorporated herein by reference.

BACKGROUND OF THE INVENTION

1. Field of the Invention

The present invention relates to a motor that is used in an electronic device or the like.

2. Description of the Related Art

In the related art, a disk spindle motor having the structure shown in FIG. 12, an axial flow fan motor having the structure shown in FIG. 13, and the like have been known as motors used in electronic devices or the like. Both the motors shown in FIGS. 12 and 13 have the following structure. That is, a radial bearing 133 supports a rotating shaft so that the rotating shaft can be rotated, or the radial bearing supports a rotor so that the rotor can be rotated with respect to the shaft. A slide bearing is used as the radial bearing 133. The shaft 131 maintains the rotation of the rotor 111 with respect to the stator 112.

The disk spindle motor 101A shown in FIG. 12 should constantly maintain the position of a turntable 102 in order to stably record and reproduce information signals on/from an optical disk. Further, the axial flow fan motor 101B shown in FIG. 13 should support the weight of an impeller 119 in every direction and attitude, and should stably rotate the impeller 119 without a thrust force during the rotation of the impeller 119. Consequently, each of the motors 101A and 101B using the radial bearing 133 that is a slide bearing and the thrust bearing 134 should generate a pressing force (hereinafter, referred to as "thrust attraction") that presses the shaft 131 against the thrust bearing 134. A method of generating the pressing force that presses the shaft 131 against the thrust bearing 134 will be described hereinafter with reference to FIG. 14. Meanwhile, FIG. 14 is an enlarged view showing the positional relationship between a magnet 120 and a core 115, which generate thrust attraction, of each of the motors 101A and 101B shown in FIGS. 12 and 13.

As shown in FIG. 14, a motor generating thrust attraction has the structure in which a magnetic center C01 of the core 115 in a thrust direction is deviated and offset from a magnetic center C02 of the magnet 120 in the thrust direction by a predetermined distance L in the thrust direction. In this motor, lines of magnetic force generated from the magnet 120 proceed to the core 115. However, since the magnetic centers are offset from each other by the distance L, the states of the lines of magnetic force are different from each other at one side (upper side) and the other side (lower side) of the core 115 in the thrust direction. In this case, the lines of magnetic force are formed along the shortest distance so that magnetic resistance is minimized.

When the distance L representing the deviation (offset distance) between the magnetic centers is changed, if L is 0, a state is stable. When the offset distance is changed from the stable state, the lines of magnetic force are different from each other at the upper and lower sides of the core. Accordingly, repulsive thrust is generated in the thrust direction due to the difference of the lines of magnetic force, and the magnetic force is increased at the upper side of the core. As a result, thrust attraction Fs that is a force attracting the shaft 131 to the thrust bearing 134 is generated. Meanwhile, thrust attraction generated due to the offset between the center of the core 115 and the center of the magnet 120 is used in various motor other than the disk spindle motor 101A and the axial flow fan motor 101B.

However, although the above-mentioned motor generating thrust attraction is inexpensive and excellent in terms of the method of attracting the shaft in the thrust direction, there is a concern that noise and vibration are generated as described below. The principle of the generation of noise and vibration will be described below with reference to FIGS. 15A to 15D.

FIGS. 15A to 15D and 16A to 16D are views illustrating the relationship between the core 115 around which a coil 114 are wound (hereinafter, referred to as a "core coil") and the magnet 120, as seen from the outside in FIG. 14, that is, side views of the core coil 114 and 115 and the magnet 120 as seen from the outside to the inside in a radial direction and cross-sectional views showing the positional relationship between the core coil 114 and 115 and the magnet 120 in the thrust direction. Meanwhile, FIGS. 15A to 15C are side views showing that thrust attraction is generated due to the offset corresponding to a distance L, and FIG. 15D is a cross-sectional view showing each of the states of FIGS. 15A to 15C and an offset state corresponding to a distance L. Further, FIGS. 16A to 16C are side views showing that offset does not occur due to L=0 and thrust attraction is not generated, and FIG. 16D is a cross-sectional view showing each of the states of FIGS. 16A to 16C and a distance L is 0.

FIGS. 15A, 15B, and 15C are views showing that the relationship between the core 115 and the magnet 120 facing the core is changed due to the rotation of the rotor 111. That is, FIG. 15A shows that the core 115 faces a portion of the magnet 120 magnetized to an N pole. FIG. 15B shows that the rotor 111 is slightly rotated from the state of FIG. 15A, that is, the core 115 faces boundary portions of the magnet 120 magnetized to an N pole and an S pole. FIG. 15C shows that the rotor 111 is further rotated slightly from the state of FIG. 15B, that is, the core faces a portion of the magnet magnetized to an S pole of the boundary portions of the magnet 120 magnetized to an N pole and an S pole.

In any state among the states of FIGS. 15A, 15B, and 15C, the core and the magnet are positioned in a relationship where the magnetic centers of the core 115 and the magnet 120 are offset from each other in the thrust direction (hereinafter, this state is referred to as "magnetic center offset") as shown in FIG. 15D. Accordingly, the shaft 131 is attracted to the thrust bearing 134 due to thrust attraction Fs that is caused by the magnetic center offset.

However, the magnetic center offset between the core 115 and the magnet 120 has an effect on the coil 114 wound around the core 115. That is, relatively high density magnetic flux M01 contributes from the magnet 120 to one side coil 114a corresponding to one side, where the magnetic center C02 of the magnet 120 is deviated and offset from the magnetic center C01 of the core 115, of both sides of the core 115 in the thrust direction, among the coil 114 wound around the core 115. Relatively low density magnetic flux M02, which is generated from the magnet 120, contributes to the other side coil 114b. In other words, the magnetic flux, which is generated from the magnet 120 and does not contribute to torque rotating the rotor 111, is orthogonal to the coil 114.

For example, due to the effect of the magnetic flux, in the state shown in FIG. 15A, constant thrust attraction Fs is generated as described above, and an unnecessary force F01 is generated in one side coil 114a, which is provided on one side of the core 115 in the thrust direction, among the coil 114 wound around the core 115 in the opposite direction X2 opposite to the direction X1 of the thrust attraction Fs. Meanwhile, a force F02 is also generated in the other side coil 114b, which is provided on the other side of the core 115 in the thrust direction, among the coil 114 wound around the core 115 in the same direction X1 as the direction of the thrust attraction Fs. However, since the magnetic flux M02 having an effect as described above has density lower than the magnetic flux M01, it may not be possible to offset the unnecessary force F01 generated in the opposite direction X2.

In this case, assuming that current flows through the coil 114 in the direction shown in FIG. 15A, if the so-called Fleming's left-hand rule is applied in a state where the N pole is dominant as shown in FIG. 15A, it is apparent that the generated unnecessary forces F01 and F02 are generated in the thrust direction and generated as described above in the opposite direction X2 to the direction of the thrust attraction Fs on one side of the core in the thrust direction. Further, it is apparent that the unnecessary forces are generated in the same direction X1 as the direction of the thrust attraction Fs on the other side of the core in the thrust direction. Meanwhile, the motor is similar to a common motor in the related art in that the phases of the N and S poles of the magnet 120 are detected by a Hall element 119 and the value of the current flowing through the coil 114 is changed in time. Meanwhile, relatively small current is supplied to the coil in the state of FIG. 15A, maximum current is supplied to the coil in the state of FIG. 15B to be described below, and relatively medium current is supplied to the coil in the state of FIG. 15C. Likewise, small current is supplied to the coil in the state of FIG. 16A, maximum current is supplied to the coil in the state of FIG. 16B, and medium current is supplied to the coil in the state of FIG. 16C.

Further, the state shown in FIG. 15B is similar to the above-mentioned state shown in FIG. 15A in that the magnetic flux has high and low density at one side and the other side coils 114a and 114b. However, since the facing portion of the magnet 120 is the boundary portion between the N pole and the S pole, the unnecessary forces are offset by the magnetic flux generated from the N pole and the S pole at any one of one side and the other side coils 114a and 114b. Therefore, unnecessary forces are not generated, and only constant thrust attraction Fs is generated as described above.

Further, the state shown in FIG. 15C is reversed to the state described with reference to FIG. 15A, and constant thrust attraction Fs is generated as described above. In addition, an unnecessary force F03 is generated in one side coil 114a, which is provided on one side of the core 115 in the thrust direction, among the coil 114 wound around the core 115 in the same direction X1 as the direction of the thrust attraction Fs. Meanwhile, a force F04 is generated in the other side coil 114b, which is provided on the other side of the core 115 in the thrust direction, among the coil 114 wound around the core 115 in the opposite direction X2 to the direction of the thrust attraction Fs. However, since the magnetic flux M04 having an effect as described above has density lower than the magnetic flux corresponding to one side coil, it may not be possible to offset the unnecessary force F03 generated in the same direction.

In this case, if current flows through the coil 114 in the direction shown in FIG. 15C, the state is changed into the state where the S pole is dominant as shown in FIG. 15C, and the so-called Fleming's left-hand rule is applied, it is apparent that the generated unnecessary forces F03 and F04 are generated in the thrust direction and generated as described above in the same direction X1 as the direction of the thrust attraction Fs on one side of the core in the thrust direction. Further, it is apparent that the unnecessary forces are generated in the opposite direction X2 to the direction of the thrust attraction Fs on the other side of the core in the thrust direction.

As described above, the unnecessary forces are repeatedly generated while the directions of the unnecessary forces are changed in the states of FIGS. 15A to 15C due to the rotation of the rotor 111. Accordingly, while being changed in the direction X1 or X2 that is toward the upper or lower side in the thrust direction, a small force is applied to the rotor 111 or the rotor minutely moves due to the small force. For this reason, there has been a concern that noise and vibration are generated.

In contrast to the state where thrust attraction is generated as shown in FIGS. 15A to 15C, in the state where offset does not occur due to L=0 as shown in FIGS. 16A to 16C and thrust attraction is not generated, the rotor 111 does not minutely move unlike in FIGS. 15A to 15C and there is no concern that undesirable vibration and noise are generated.

That is, in any state of the states of FIGS. 16A to 16C, the core and the magnet are positioned in a relationship where the magnetic centers C01 and C02 of the core 115 and the magnet 120 coincide with each other as shown in FIG. 16D.

Since the magnetic centers of the core 115 and the magnet 120 coincide with each other, there is no effect on the coil 114 wound around the core 115, that is, substantially the same density magnetic flux M03 and M04 contribute to both one side and the other side coils 114a and 114b corresponding to both sides of the core 115 in the thrust direction among the coil 114 wound around the core 115.

For example, in the state shown in FIG. 16A, an unnecessary force F05 is generated in one side coil 114a among the coil 114 wound around the core 115 in one direction X2 (toward the upper side in FIG. 16A). However, at the same time, an unnecessary force F06 is generated in the other side coil 114b among the coil 114 wound around the core 115 in the opposite direction X1 (toward the lower side in FIG. 16A) to the direction of the unnecessary force F05 that is generated in one side coil 114a. Accordingly, substantially the same density of magnetic flux M03 and M04 have an effect on one side and the other side coils 114a and 114b, so that the forces are offset to each other.

Further, in the state shown in FIG. 16B, like the case of FIG. 15B, the unnecessary forces are offset by the magnetic flux generated from the N pole and the S pole at any one of one side and the other side coils 114a and 114b. Therefore, the unnecessary forces are not generated.

In addition, in the state shown in FIG. 16C, like the case of FIG. 16A, an unnecessary force F07 is generated in one side coil 114a among the coil 114 wound around the core 115 in the other direction X1. However, at the same time, an unnecessary force F08 is generated in the other side coil 114b among the coil 114 wound around the core 115 in the opposite direction X2 to the direction of the unnecessary force F07 that is generated in one side coil 114a. Accordingly, substantially the same density of magnetic flux M03 and M04 have an effect on one side and the other side coils 114a and 114b, so that the forces are offset to each other.

When the magnetic center offset between the core 115 and the magnet 120 that has been described with reference to FIGS. 16A to 16C does not occur, the minute movement of the rotor 111 occurring in the thrust direction in the cases of FIGS. 15A to 15C or undesirable vibration and noise caused by the minute movement are not generated.

However, when the magnetic center offset between the core 115 and the magnet 120 does not occur as shown in FIGS. 16A to 16C, the thrust attraction necessary to function as a motor should be generated by the separate structure.

In the related art, there has been a motor that obtains thrust attraction by using a dedicated thrust-attraction magnet like a motor disclosed in JP-A-11-252878. Specifically, there have been a disk spindle motor 141A and an axial flow fan motor 141B shown in FIGS. 17 and 18. The structure of a thrust-attraction magnet 142 used in FIGS. 17 and 18 will be described in detail below with reference to FIG. 19. Meanwhile, FIG. 19 is an enlarged view of a portion, on which the thrust-attraction magnet 142 is mounted, of each of the motors shown in FIGS. 17 and 18. In FIGS. 17 to 19 and the following description, the same components as the components of the motors shown in FIGS. 12 and 13 are indicated by the same reference numerals and the detailed description thereof will be omitted.

Each of the motors 141A and 141B is provided with a thrust-attraction magnet 142, which includes a back yoke 143, on a stator 112 as shown in FIG. 19. The thrust-attraction magnet 142 attracts a rotor yoke 111a, and generates thrust attraction that attracts a rotor 111 and a shaft 131, which is integrally fixed to the rotor, to a thrust bearing 134. Each of the motors shown in FIGS. 17 and 18 generates thrust attraction by using the above-mentioned thrust-attraction magnet 142, and is to avoid unnecessary vibration and noise. Meanwhile, although each of the motors 141A and 141B shown in FIGS. 17 and 18 has been provided with the magnet 142 on the stator 112, the magnet may be provided on the rotor 111 and an attraction yoke that attracts a magnetic body may be provided on the stator 112. Meanwhile, a neodymium magnet, which has relatively large energy product, has been used as the thrust-attraction magnet in order to stabilize attraction and prevent variation.

However, according to each of the motors 141A and 141B including the thrust-attraction magnet 142, manufacturing cost is increased due to the addition of the structure, the limitation on a mounting space is increased, and an air gap ga between the magnet and the attraction yoke should be maintained. For this reason, if the structure against vibration and noise is added, there is a problem in that cost is increased. Further, it is difficult to simplify the structure, to reduce manufacturing cost, and to suppress unnecessary vibration and noise, at the same time.

SUMMARY OF THE INVENTION

It is desirable to provide a motor in which a magnetic center of a core around which coil are wound is offset from a magnetic center of a magnet in a thrust direction, so that a shaft is attracted to a thrust bearing, and natural vibration can be suppressed during the driving.

According to an embodiment of the invention, there is provided a motor. The motor includes a shaft that serves as a rotation center when a rotor is rotated with respect to a stator, a bearing that supports the shaft in a circumferential direction of the shaft, a thrust bearing that supports one end of the shaft in a thrust direction of the shaft, a magnet that is fixed to the rotor and alternately magnetized to different poles in a rotational direction of the shaft, a core that is fixed to the stator and disposed to face the magnet in a radial direction of the shaft, and coil that are wound around the core. A magnetic center of the core is offset from a magnetic center of the magnet in the thrust direction, so that the shaft is attracted to the thrust bearing. The motor further includes a magnetic shield that shields leakage flux leaking from the magnet to the coil.

The motor according to the embodiment of the invention has the structure in which the magnetic center of the core around which coil are wound is offset from the magnetic center of the magnet in the thrust direction, so that the shaft is attracted to the thrust bearing. The motor further includes the magnetic shield that shields the leakage flux leaking from the magnet to the coil. It may be possible to suppress unnecessary vibration and noise that are generated due to the effect of the leakage flux on the coil. That is, it may be possible to simplify the structure, to reduce manufacturing cost, and to suppress unnecessary vibration and noise without a dedicated thrust-attraction magnet.

BRIEF DESCRIPTION OF THE DRAWINGS

FIGS. 11A and 11B are views comparatively showing the change in the noise level of the motor according to the embodiment of the invention and a motor to be compared with the motor, wherein FIG. 11A is a view showing the noise level when the magnetic shield is not provided, and FIG. 11B is a view showing the noise level when the magnetic shield is provided;

FIGS. 15A to 15D are views illustrating that vibration and noise are generated during the rotation of a rotor when thrust attraction is generated due to magnetic center offset in the motor in the related art, wherein FIG. 15A is a side view showing that the core and the coil face the portion of the magnet magnetized to an N pole, FIG. 15B is a side view showing that the core and the coil face the boundary portion of the magnet between an N pole and an S pole, FIG. 15C is a side view showing that the core and the coil face the portion of the magnet where the S pole is dominant, and FIG. 15D is a cross-sectional view showing the magnetic center offset between the core and the magnet;

FIGS. 16A to 16D are views illustrating that vibration and noise are not generated during the rotation of the rotor when the magnetic center offset does not occur in the motor in the related art in the case of FIGS. 15A to 15D, wherein FIG. 16A is a side view showing that the core and the coil face the portion of the magnet magnetized to the N pole, FIG. 16B is a side view showing that the core and the coil face the boundary portion of the magnet between the N pole and the S pole, FIG. 16C is a side view showing that the core and the coil face the portion of the magnet where the S pole is dominant, and FIG. 16D is a cross-sectional view showing that the magnetic center offset does not occur between the core and the magnet;

DESCRIPTION OF THE PREFERRED EMBODIMENTS

A motor according to an embodiment of the invention will be described below with reference to accompanying drawings.

A motor used in a heat radiator of an electronic device such as a portable computer, which is an information processor performing an arithmetic operation of various kind of information, will be described in this embodiment. A heat radiator is provided in the portable computer. The heat radiator includes a metal base, a motor 1 fixed to the base, a fan 3 rotated by the motor 1, a fan case 4 that receives the fan 3, and a heatsink. The motor 1 that rotatably drives the fan 3 of the heat radiator will be described in detail.

Figure 1:
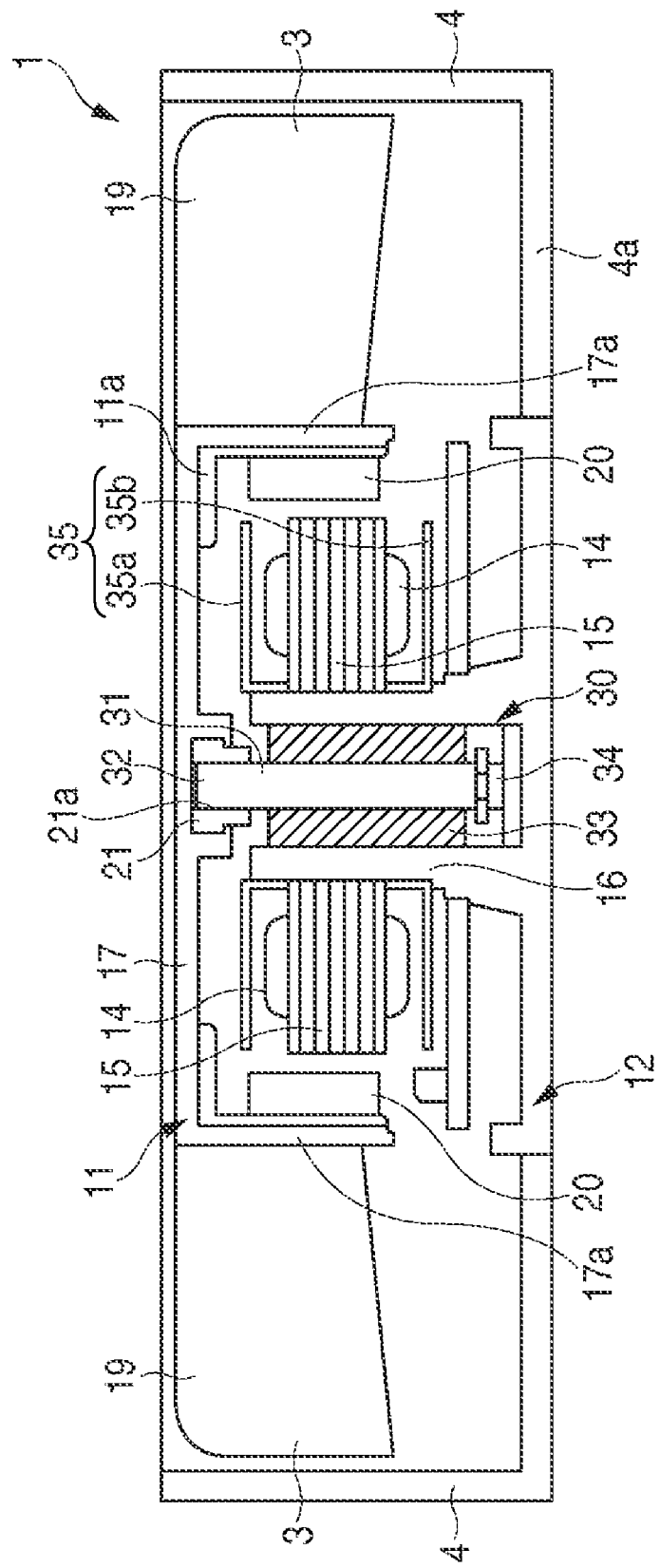
FIG. 1 is a cross-sectional view of a motor according to an embodiment of the invention.

The motor 1 according to the embodiment of the invention includes a rotor 11 and a stator 12 as shown in FIG. 1.

The stator 12 is integrally formed with the motor 1 and the fan case 4 that receives the fan 3 rotated by the motor 1. The stator 12 includes a bearing unit 30, a coil 14, and a core 15 around which the coil 14 are wound. The stator 12 is fixed to an upper surface 4a of the fan case 4 so as to be integrally formed with the fan case. The stator 12 is made of, for example, iron. The bearing unit 30 is fixed to a cylindrical holder 16, which is formed in the central portion of the stator 12, by performing press-fitting, adhesion, or press-fitting and adhesion. Meanwhile, the holder 16 into which the bearing unit 30 is press-fitted is integrally formed with the stator 12 so as to have a cylindrical shape.

As shown in FIG. 1, the core 15 is fixed to the outer portion of the holder 16, which is the outer peripheral portion of the bearing unit 30 integrally fixed to the stator 12. The coil 14 to which drive current is supplied are wound around the core 15.

The rotor 11 that forms the motor 1 together with the stator 12 is fixed to a rotating shaft 31 that is rotatably supported by the bearing unit 30, and is integrally rotated with the rotating shaft 31. The rotor 11 includes a blade boss 17, the fan 3 that includes a plurality of blades 19 integrally rotated with the blade boss 17, and a rotor yoke 11a that is fixed to the inner peripheral surface of the blade boss 17. The blades 19 of the fan 3 are integrally formed with the blade boss 17, for example, by performing outset molding on the outer peripheral surface of the blade boss 17.

A ring-shaped rotor magnet 20 is fixed to the inner peripheral surface of the rotor yoke 11a, which is fixed to the blade boss 17, so as to face the coil 14 of the stator 12. The magnet 20 is a magnet that is alternately magnetized to an S pole and an N pole in the circumferential direction of the rotating shaft 31. The magnet is fixed to the inner peripheral surface of the rotor yoke 11a, for example, by an adhesive so as to be integrally formed with the blade boss 17. Meanwhile, the core 15 around which the above-mentioned coil 14 are wound faces the magnet 20 in the radial direction of the rotating shaft 31.

A boss portion 21, which has a through hole 21a formed at the center of a flat plate-shaped portion 17b, is press-fitted to a mounting portion 32 that is formed at the front end of the rotating shaft 31 supported by the bearing unit 30, so that the blade boss 17 is fixed to the rotating shaft 31 so as to be integrally rotated with the rotating shaft.

The rotating shaft 31 fixed to the stator 12 is rotatably supported by the bearing unit 30. The bearing unit includes a radial bearing 33 and a thrust bearing 34. The radial bearing supports the rotating shaft 31 in the circumferential direction of the rotating shaft. A bearing support portion 31a formed at one end of the rotating shaft 31, which is supported by the radial bearing 33, in a thrust direction is rotatably supported by the thrust bearing 34.

The radial bearing 33 is a slide bearing that supports the rotating shaft 31 in the circumferential direction of the rotating shaft. A slide bearing has been used as the radial bearing 33 in this embodiment, but the radial bearing is not limited to a slide bearing. For example, an oil-impregnated sintered bearing or a dynamic pressure fluid bearing may be used as the radial bearing.

The bearing unit 30 supports the rotating shaft 31 in the circumferential direction and the thrust direction by the radial bearing 33 and the thrust bearing 34 so that the rotating shaft is freely rotated.

In the case of the motor 1 having the above-mentioned structure, when drive current is supplied to the coil 14 of the stator 12 from a drive circuit provided outside the motor 1 through a predetermined conduction pattern, the rotor 11 is integrally rotated with the rotating shaft 31 due to an interaction between a magnetic field generated in the coil 14 and a magnetic field generated by the rotor magnet 20 of the rotor 11. The fan 3, which is fixed to the rotor 11 and includes the plurality of blades 19, is also integrally rotated with the rotor 11 due to the rotation of the rotor 11. When the fan 3 is rotated, the heat radiator including the motor 1, for example, sucks air from the outside of the heat radiator, allows the air to flow through a case of the computer, and discharges the air to the outside of the case through the heatsink provided in the case. As a result, the heat radiator radiates the heat, which is generated from heater elements, to the outside of the computer and cools the computer.

The core 15 around which the coil 14 are wound and the magnet 20 of the motor 1 are disposed so that the magnetic centers of the core and the magnet are deviated and offset from each other. That is, in order to generate attraction in a direction opposite to a direction in which the rotating shaft 31 is supported by the thrust bearing 34, the core and the magnet are disposed so that the magnetic center of one of the core 15 and the magnet 20 integrally fixed to the rotating shaft 31 is deviated from the magnetic center of the other thereof integrally fixed to the thrust bearing 34 in the direction in which the rotating shaft is supported.

Specifically, the core and the magnet are disposed so that the magnetic center C12 of the magnet 20, which is integrally fixed to the rotating shaft 31 through the rotor 11, is deviated from the magnetic center C11 of the core 15, which is integrally fixed to the thrust bearing 34 through the stator 12, toward the upper side in the drawing, that is, in the direction in which the rotating shaft is supported.

The core 15 and the magnet 20, which are disposed as described above, are disposed in a relationship where the magnetic centers of the core and the magnet are deviated and offset from each other in the thrust direction (hereinafter, this state is referred to as "magnetic center offset"). Accordingly, a force (hereinafter, referred to as "thrust attraction") Fs, which attracts the rotating shaft 31 of the rotor 11 to the thrust bearing 34 of the stator 12, is generated. As a result, the rotating shaft can be attracted to the thrust bearing.

Further, the motor 1 is provided with a magnetic shield 35 that shields leakage flux leaking from the magnet 20 to the coil 14. That is, the magnetic shield 35 solves the following problem. In order to generate thrust attraction Fs, the core 15 around which the coil 14 are wound (hereinafter, referred to as a "core coil") and the magnet 20 are disposed so as to have the magnetic center offset. For this reason, as described with reference to FIGS. 15A to 15C, unnecessary forces are generated while the magnitude and the direction of the unnecessary forces are changed, and undesirable vibration and noise are generated due to the unnecessary forces.

Figure 2:
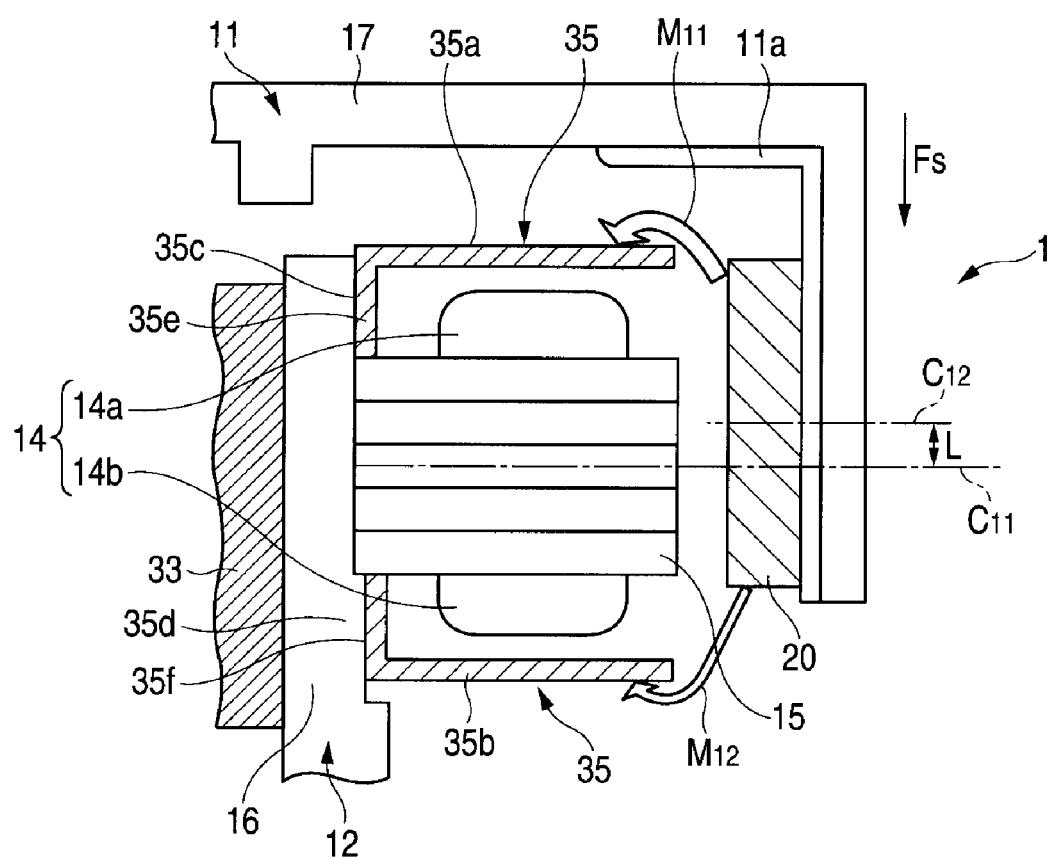
FIG. 2 is an enlarged cross-sectional view of a magnet, a coil, a core, a magnetic shield of the motor according to the embodiment of the invention.

Specifically, as shown in FIG. 2, the magnetic shield 35 includes a first shielding plate 35*a* and a second shielding plate 35*b*. The first shielding plate is formed substantially in the shape of a disk so as to cover one side coil 14*a* of the coil 14 in the thrust direction, and is provided on one side of the coil 14 in the thrust direction. The second shielding plate is formed substantially in the shape of a disk so as to cover the other side coil 14*b* of the coil 14 in the thrust direction, and is provided on the other side of the coil 14 in the thrust direction.

Figure 3:
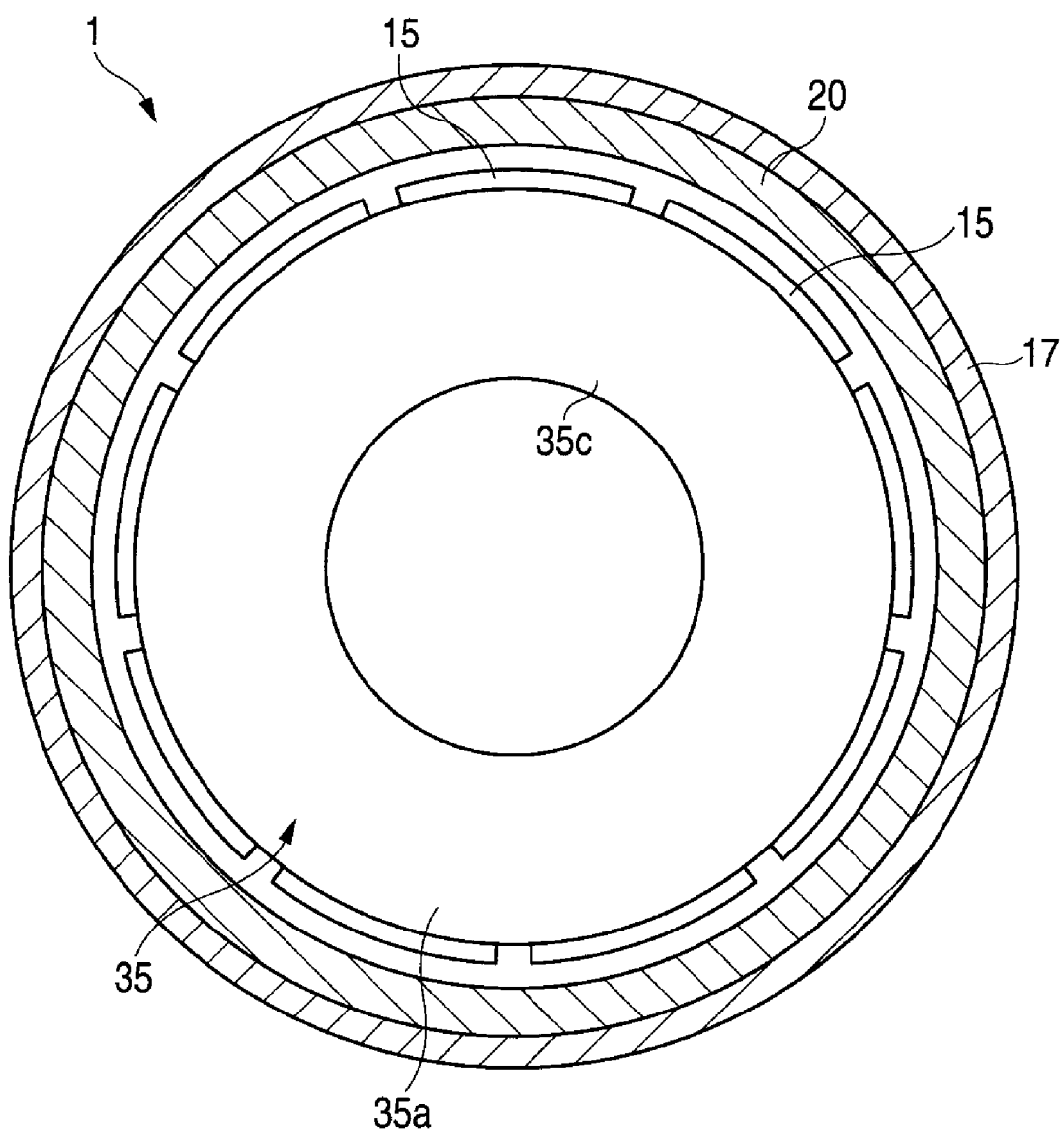
FIG. 3 is a view illustrating the structure of the magnetic shield of the motor according to the embodiment of the invention, and is a plan cross-sectional view of the motor.

As shown in FIGS. 2 and 3, the outermost peripheral portions of the first and second shielding plates 35*a* and 35*b* are formed so as to be positioned inside the outer ends of the core 15.

Further, substantially circular insertion holes 35*c* and 35*d* into which the rotating shaft 31 is inserted are formed substantially at the central portions of the first and second shielding plates 35*a* and 35*b*, respectively, that is, each of the first and second shielding plates is formed in a substantially annular shape. Furthermore, the innermost peripheral portions of the first and second shielding plates 35*a* and 35*b* are formed so as to be positioned at substantially the same positions as the inner ends of the core 15 or outside the inner ends of the core.

In other words, as shown in FIG. 3, each of the first and second shielding plates 35*a* and 35*b* has a diameter larger than the width of the coil 14 in the radial direction, and is formed in a substantially annular shape so as to cover between the inner and outer diameters of the core 15 in the thrust direction.

Meanwhile, although the outermost peripheral portions of the first and second shielding plates 35*a* and 35*b* have been formed so as to be positioned inside the outer ends of the core 15 in the above description, the invention is not limited thereto. For example, the outermost peripheral portions may be formed so as to be positioned at substantially the same positions as the outer ends of the core 15. Likewise, the innermost peripheral portions of the first and second shielding plates 35*a* and 35*b* may be formed so as to be positioned at substantially the same positions as the inner ends of the core 15 or may be positioned outside the inner ends of the core 15.

The outermost peripheral portions of the first and second shielding plates 35*a* and 35*b* are formed so as to be positioned at substantially the same positions as the outer ends of the core 15 or inside the outer ends of the core 15, and the innermost peripheral portions thereof are formed so as to be positioned at substantially the same positions as the inner ends of the core 15 or outside the inner ends of the core 15. Therefore, while there is no effect on the magnetic field generated by the magnet 20 that rotates the rotor 11 when drive current is supplied to the coil 14 and the above-mentioned thrust attraction, it may be possible to shield the only leakage flux leaking to the coil 14 to be described below.

The first and second shielding plates 35*a* and 35*b* are fixed to the holder 16 that is a part of a housing of the stator 12. Inner peripheral walls 35*e* and 35*f* are formed at the first and second shielding plates 35*a* and 35*b* by pressing, respectively, so as to have a dimension larger than the thickness of the plate in the thrust direction, and are fixed to the holder 16 by press-fitting, adhesion, or thermal welding. Meanwhile, the spaces inside the inner peripheral surfaces of the inner peripheral walls 35*e* and 35*f* form the above-mentioned insertion holes 35*c* and 35*d*, respectively.

Further, each of the first and second shielding plates 35*a* and 35*b* of the magnetic shield 35 is made of a magnetic material. For example, a tin-plated steel plate suitable for deep drawing may be used as each of the first and second shielding plates.

The first and second shielding plates 35*a* and 35*b* of the magnetic shield 35 can shield the magnetic flux that is generated by the magnet 20 and has an effect on the coil 14 wound around the core 15 due to the magnetic center offset between the core 15 and the magnet 20, and eliminate the effect. In this way, the first and second shielding plates 35*a* and 35*b* can prevent the leakage flux, which is generated by the coil 14 and the magnet 20, from crossing each other.

The magnetic shield 35, which includes the first and second shielding plates 35*a* and 35*b*, shields the leakage flux leaking from the magnet 20 to the coil 14. Therefore, the magnetic shield solves a problem generated when the magnetic center of the core 15 is deviated and offset from the magnetic center of the magnet 20 in order to generate thrust attraction, that is, a problem in that high density magnetic flux M11 and low density magnetic flux M12 contribute to one side coil 14*a* corresponding to one side of the core 15 in the thrust direction and the other side coil 14*b* corresponding to the other side thereof, respectively, so that unnecessary forces are generated and vibration and noise are generated due to the unnecessary forces.

Further, the first and second shielding plates and the core are disposed so that the centers of the inner and outer peripheral portions of the first and second shielding plates 35*a* and 35*b* formed in the annular shape substantially coincide with the center of the core 15, that is, coaxiality is as small as possible. For this reason, it may be possible to reduce effects of rotary torque and cogging.

Furthermore, the first and second shielding plates 35*a* and 35*b* are disposed at positions that are as close as possible to the coil 14, so that it may be possible to effectively shield the leakage flux leaking from the magnet 20 to the coil 14.

As described above, the motor 1 according to the embodiment of the invention includes the rotating shaft 31 that serves as a rotation center when the rotor 11 is rotated with respect to the stator 12, the radial bearing 33 that supports the rotating shaft 31 in the circumferential direction of the rotating shaft, the thrust bearing 34 that supports one end of the rotating shaft 31 in the thrust direction of the rotating shaft, the magnet 20 that is fixed to the rotor 11 and alternately magnetized to different poles in the rotational direction of the rotating shaft 31, the core 15 that is fixed to the stator 12 and disposed to face the magnet 20 in the radial direction of the rotating shaft 31, and the coil 14 that are wound around the core 15. The magnetic center of the core 15 is offset from the magnetic center of the magnet 20 in the thrust direction, so that the rotating shaft 31 is attracted to the thrust bearing 34. Since the first and second shielding plates 35a and 35b are provided as the magnetic shield 35 that shields the leakage flux leaking from the magnet 20 to the coil 14, thrust attraction is generated due to the magnetic center offset between the core 15 and the magnet 20. Therefore, a magnet as an independent and dedicated thrust-attraction member does not need to be provided. Further, it may be possible to solve a problem, which is generated due to the magnetic center offset between the core 15 and the magnet 20, by the magnetic shield 35. That is, it may be possible to reduce or prevent unnecessary forces generated due to the leakage flux that leaks from the magnet 20 to the coil 14, and unnecessary vibration and noise generated due to the unnecessary forces. Accordingly, the motor 1 according to the embodiment of the invention does not need to include a dedicated thrust-attraction magnet. As a result, it may be possible to simplify the structure, to reduce manufacturing cost, and to suppress unnecessary vibration and noise.

In other words, the motor 1 obtains thrust attraction, which is necessary to avoid unnecessary vibration and noise generated when a slide bearing is used as the radial bearing, by using the simple structure having the above-mentioned magnetic center offset at low cost. Further, the motor suppresses the unnecessary vibration and noise, which are problems of the structure having the magnetic center offset causing the thrust attraction.

When a dynamic pressure fluid bearing is used as the radial bearing of the motor 1, it may be possible to suppress unnecessary vibration and noise without the above-mentioned dedicated thrust-attraction magnet. In addition, since the rotation performance is improved by the dynamic pressure fluid bearing, it may be possible to achieve low vibration and low noise by the performance of the radial bearing. As a result, it may be possible to achieve further low vibration and low noise as a whole.

The above-mentioned motor 1 is provided with the first shielding plate 35a, which is provided on one side of the coil 14 in the thrust direction so as to cover one side coil 14a of the coil 14 in the thrust direction, and the second shielding plate 35b, which is provided on the other side of the coil 14 in the thrust direction so as to cover the other side coil 14b of the coil 14 in the thrust direction, as the magnetic shield that shields the leakage flux leaking from the magnet 20 to the coil 14. However, the invention is not limited thereto, and the magnetic shield of the motor according to the embodiment of the invention may be provided on at least one side of the coil 14 in the thrust direction so as to cover any one side coil of the coil 14 in the thrust direction. In this case, if the magnetic shield is provided to cover one side coil of the coil 14 in the thrust direction, the magnetic shield is provided on one side where the leakage flux leaking from the magnet 20 to the coil 14 has high density, that is, on one side where the magnetic center of the magnet 20 is offset from the magnetic center of the core 15, so that the magnetic shield can be further effective.

Figure 4:
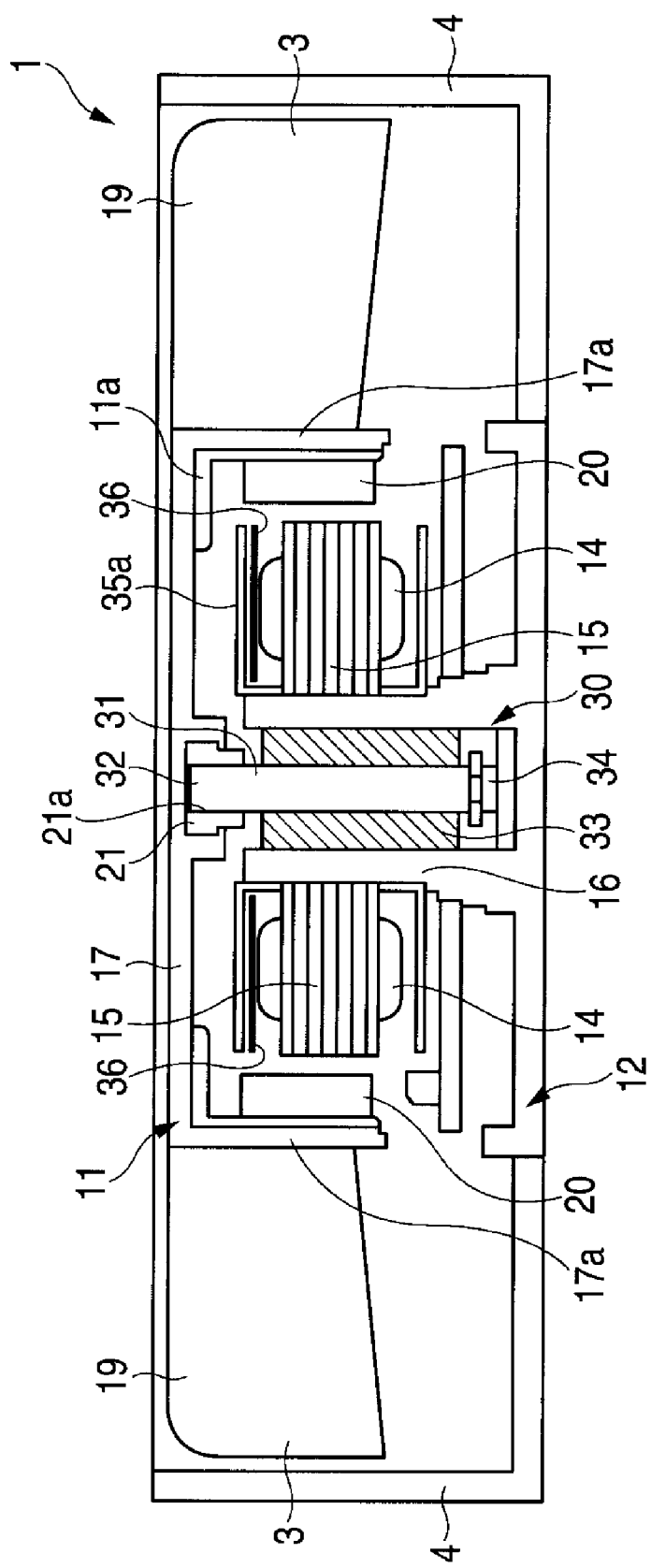
FIG. 4 is a cross-sectional view showing that the magnetic shield of the motor according to the embodiment of the invention is provided on one side of the coil.

That is, for example, as shown in FIG. 4, the motor according to the embodiment of the invention may be provided with the magnetic shield including the only first shielding plate 35a that is provided on one side of the coil 14 in the thrust direction so as to cover one side coil 14a of the coil 14 in the thrust direction where the leakage flux leaking from the magnet 20 to the coil 14 has high density. Since the thrust attraction is generated due to the magnetic center offset between the core 15 and the magnet 20, the motor provided with the magnetic shield that includes the only first shielding plate 35a shown in FIG. 4 does not need to include an independent and dedicated thrust-attraction member. Further, it may be possible to solve a problem generated due to the magnetic center offset by using the simple structure as compared to when the above-mentioned first and second shielding plates 35a and 35b are provided. That is, it may be possible to reduce or prevent unnecessary forces generated due to the leakage flux that leaks from the magnet 20 to the coil 14, and unnecessary vibration and noise generated due to the unnecessary forces. As a result, it may be possible to simplify the structure, to reduce manufacturing cost, and to suppress unnecessary vibration and noise. Meanwhile, the motor shown in FIG. 4 further includes insulating members 36. The advantage of the motor will be described below with reference to FIG. 5.

Figure 5:
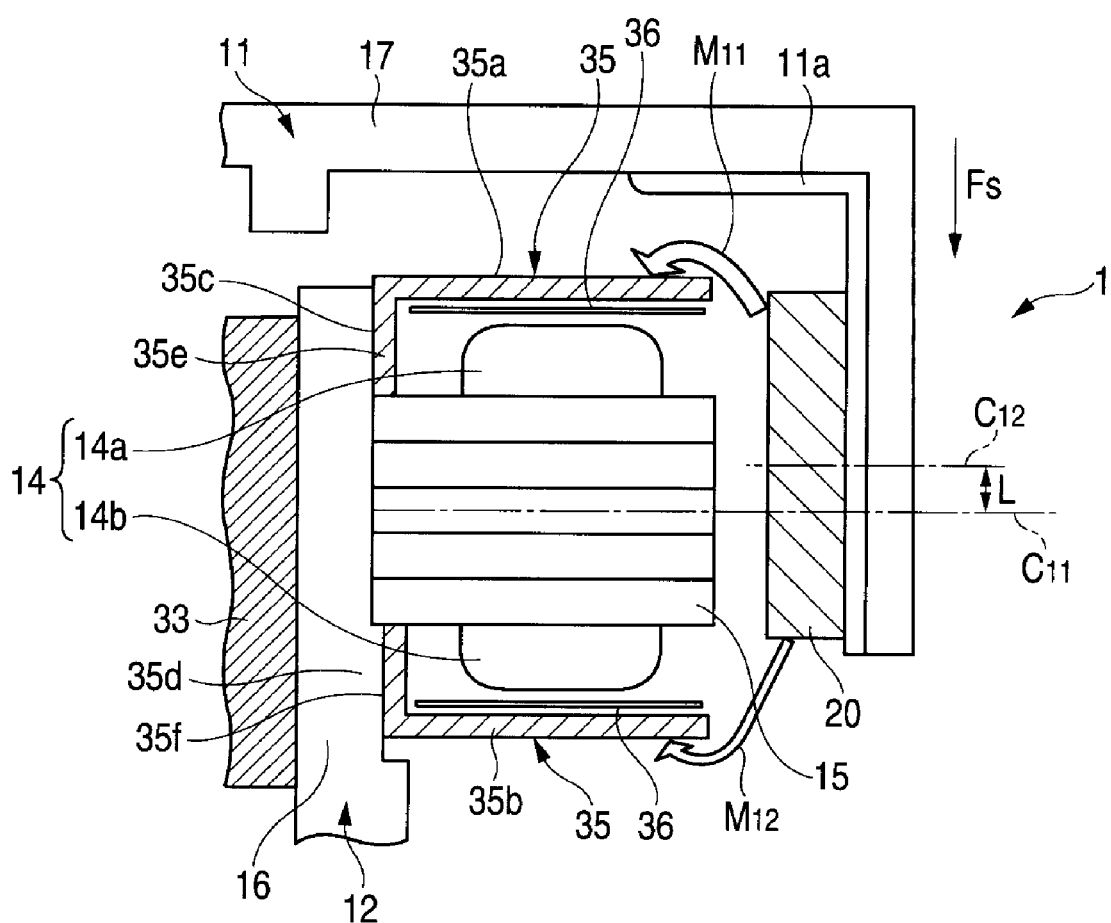
FIG. 5 is an enlarged cross-sectional view that insulating members are provided in the motor according to the embodiment of the invention.

As shown in FIG. 5, the motor according to the embodiment of the invention may include insulating members 36 in addition to the above-mentioned structure, in order to prevent insulation failure between the magnetic shield 35 and the coil 14.

That is, each of the insulating members 36 shown in FIG. 5 is provided between each of the first and/or second shielding plates 35a and 35b, which is formed in a substantially annular shape so as to cover one side and/or the other side coils 14a and/or 14b of the coil 14 in the thrust direction and is provided on one side and/or the other side of the coil 14 in the thrust direction, and each of one side and/or the other side coils 14a and/or 14b of the coil 14 in the thrust direction that are covered with the shielding plates. Each of the insulating members 36 may be made of a material having an insulation property. It is preferable that the insulating member be made of plastics such as, nylon, polyester, or polyimide. For example, the insulating members 36 are fixed to the inner surfaces of the first and second shielding plates 35a and 35b, so as to be disposed at the above-mentioned positions.

Each of the insulating members 36 can reliably insulate the magnetic shield 35 from the coil 14. Therefore, it may be possible to more reliably reduce the leakage of the magnetic flux, which leaks from the magnet 20 to the coil 14, by the magnetic shield 35.

The motor that is provided with the insulating members 36 shown in FIG. 4 includes a rotating shaft 31, a radial bearing 33, a thrust bearing 34, a magnet 20, a core 15, and a coil 14, like the above-mentioned motor 1. The magnetic center of the core 15 is offset from the magnetic center of the magnet 20 in the thrust direction, so that the rotating shaft 31 is attracted to the thrust bearing 34. The motor further includes a magnetic shield 35 that shields the leakage flux leaking from the magnet 20 to the coil 14, and the insulating members 36 provided between the magnetic shield 35 and the coil 14. Therefore, it may be possible to more effectively shield the leakage flux leaking from the magnet 20 to the coil 14 that is a problem of the magnetic center offset causing the thrust attraction. As a result, it may be possible to reduce or prevent unnecessary forces generated due to the leakage flux, and unnecessary vibration and noise generated due to the unnecessary forces.

Figure 6:
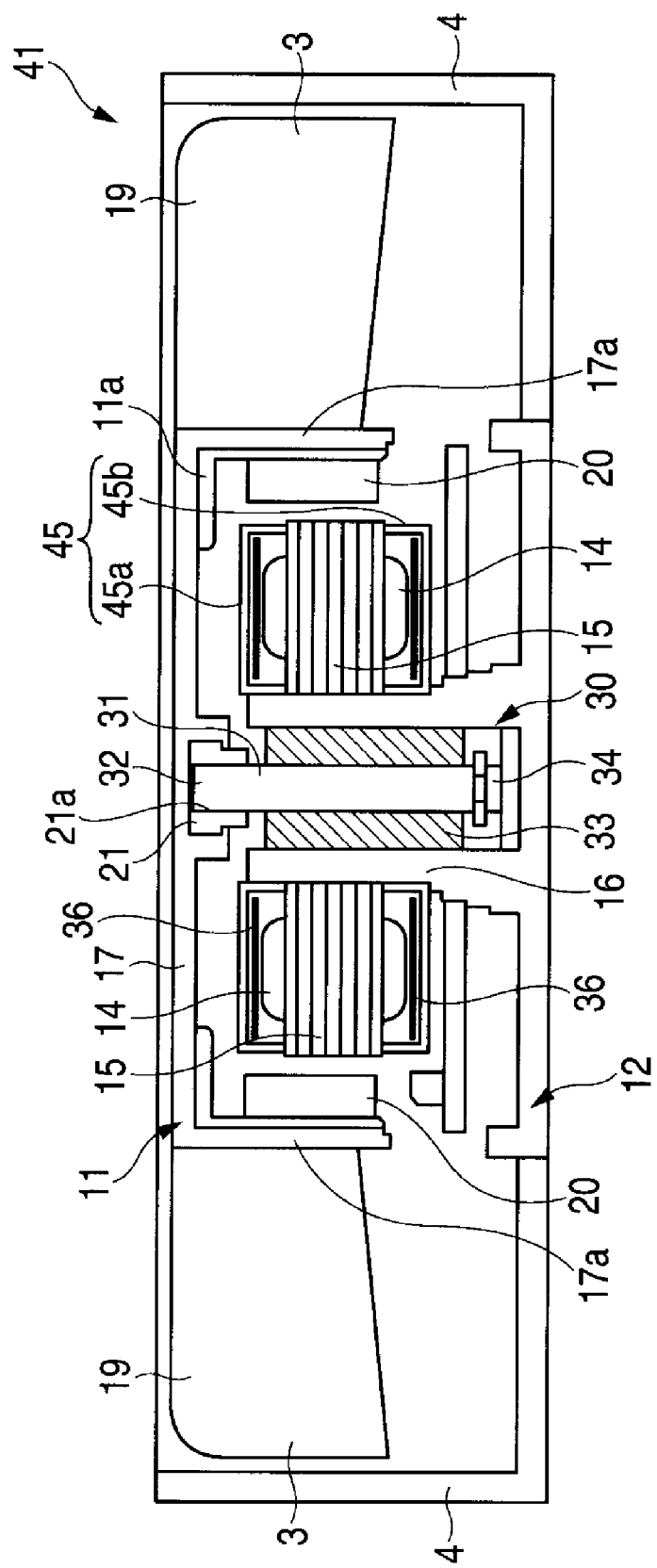
FIG. 6 is a cross-sectional view of a motor according to another embodiment of the invention.

A motor, which includes a magnetic shield having different shape, may have the structure shown in FIG. 6. Meanwhile, in the following description, the same components as the components of the motor 1 shown in FIG. 1 are indicated by the same reference numerals and the detailed description thereof will be omitted.

A motor 41 according to another embodiment of the invention includes a rotor 11, a stator 12, a rotating shaft 31, a bearing unit 30 that includes a radial bearing 33 and a thrust bearing 34, a magnet 20, a core 15, and coil 14, as shown in FIG. 6.

The core 15 around which the coil 14 are wound and the magnet 20 of the motor 41 are disposed so that the magnetic centers of the core and the magnet are deviated and offset from each other like in the above-mentioned motor 1. Accordingly, the thrust attraction is generated as described above, so that the rotating shaft 31 is attracted to the thrust bearing 34.

Further, the motor 41 is provided with a magnetic shield 45 that shields leakage flux leaking from the magnet 20 to the coil 14. That is, the magnetic shield 45 solves the following problem. In order to generate thrust attraction, the core coil 14 and 15 and the magnet 20 are disposed so as to have the magnetic center offset. For this reason, unnecessary forces are generated while the magnitude and the direction of the unnecessary forces are changed, and undesirable vibration and noise are generated due to the unnecessary forces.

Figure 7:
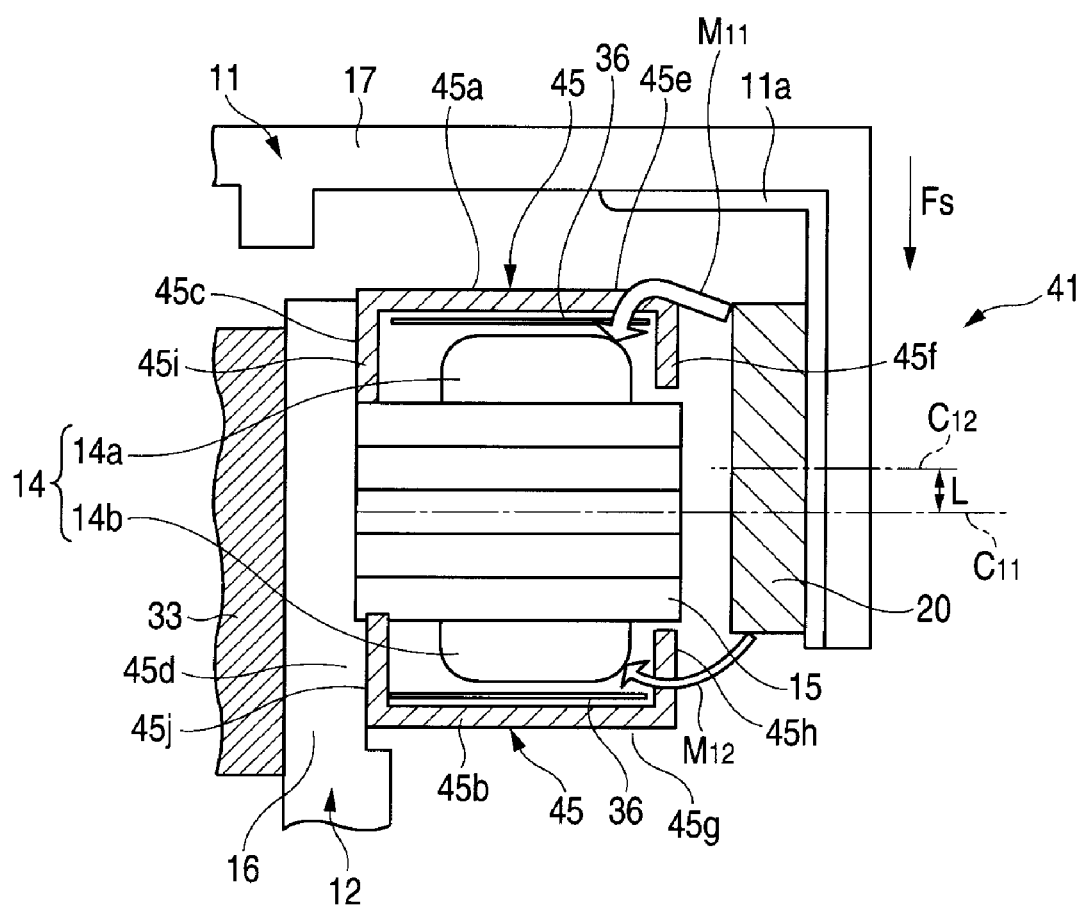
FIG. 7 is an enlarged cross-sectional view of a magnet, a coil, a core, and a magnetic shield of the motor shown in FIG. 6.

Specifically, as shown in FIG. 7, the magnetic shield 45 includes a first shielding plate 45a that covers one side coil 14a of the coil 14 in the thrust direction, and a second shielding plate 45b that covers the other side coil 14b of the coil 14 in the thrust direction.

The first shielding plate 45a includes a disk-shaped part 45e and an outer peripheral wall 45f. The disk-shaped part is formed substantially in the shape of a disk so as to cover one side coil 14a of the coil 14 in the thrust direction. The outer peripheral wall protrudes from the outermost peripheral portion of the disk-shaped part 45e toward the core 15, and is formed in a cylindrical shape so as to cover one side coil 14a of the coil 14, which protrudes from the core 15 in the thrust direction, from the outside in the radial direction of the rotating shaft 31.

Further, the second shielding plate 45b includes a disk-shaped part 45g and an outer peripheral wall 45h. The disk-shaped part is formed substantially in the shape of a disk so as to cover the other side coil 14b of the coil 14 in the thrust direction. The outer peripheral wall protrudes from the outermost peripheral portion of the disk-shaped part 45g toward the core 15, and is formed in a cylindrical shape so as to cover the other side coil 14b of the coil 14, which protrudes from the core 15 in the thrust direction, from the outside in the radial direction of the rotating shaft 31. In this way, the first and second shielding plates 45a and 45b are formed substantially in the shape of a cup shape.

The outermost peripheral portions of the first and second shielding plates 45a and 45b are formed so as to be positioned inside the outer ends of the core 15.

Further, substantially circular insertion holes 45c and 45d into which the rotating shaft 31 is inserted are formed substantially at the central portions of the disk-shaped parts 45e and 45g of the first and second shielding plates 45a and 45b, respectively, that is, each of the first and second shielding plates is formed in a substantially annular shape. Furthermore, the innermost peripheral portions of the first and second shielding plates 45a and 45b are formed so as to be positioned at substantially the same positions as the inner ends of the core 15 or outside the inner ends of the core.

In other words, each of the disk-shaped parts 45e and 45g of the first and second shielding plates 45a and 45b has a diameter larger than the width of the coil 14 in the radial direction, and is formed in a substantially annular shape so as to cover between the inner and outer diameters of the core 15 in the thrust direction.

Meanwhile, like the above-mentioned magnetic shield 35, the outermost peripheral portions of the first and second shielding plates 45a and 45b of the magnetic shield 45 may be formed so as to be positioned at substantially the same positions as the outer ends of the core 15.

The outermost peripheral portions of the first and second shielding plates 45a and 45b are formed so as to be positioned at substantially the same positions as the outer ends of the core 15 or inside the outer ends of the core 15, and the innermost peripheral portions thereof are formed so as to be positioned at substantially the same positions as the inner ends of the core 15 or outside the inner ends of the core 15. Therefore, while there is no effect on the magnetic field generated by the magnet 20 that rotates the rotor 11 when drive current is supplied to the coil 14 and the above-mentioned thrust attraction, it may be possible to shield the only leakage flux leaking to the coil 14 to be described below.

The first and second shielding plates 45a and 45b are fixed to the holder 16 that is a part of a housing of the stator 12. Inner peripheral walls 45i and 45j are formed at the first and second shielding plates 45a and 45b by pressing, respectively, so as to have a dimension larger than the thickness of the plate in the thrust direction, and are fixed to the holder 16 by press-fitting, adhesion, or thermal welding. Meanwhile, the spaces inside the inner peripheral surfaces of the inner peripheral walls 45i and 45j form the above-mentioned insertion holes 45c and 45d, respectively.

The first and second shielding plates 45a and 45b of the magnetic shield 45 can shield the magnetic flux that is generated by the magnet 20 and has an effect on the coil 14 wound around the core 15 due to the magnetic center offset between the core 15 and the magnet 20, and eliminate the effect. In this way, the first and second shielding plates 45a and 45b can prevent the leakage flux, which is generated by the coil 14 and the magnet 20, from crossing each other.

The magnetic shield 45, which includes the first and second shielding plates 45a and 45b, shields the leakage flux leaking from the magnet 20 to the coil 14. Therefore, the magnetic shield solves a problem generated when the magnetic center of the core 15 is deviated and offset from the magnetic center of the magnet 20 in order to generate thrust attraction, that is, a problem in that high density magnetic flux M11 and low density magnetic flux M12 contribute to one side coil 14a corresponding to one side of the core 15 in the thrust direction and the other side coil 14b corresponding to the other side thereof, respectively, so that unnecessary forces are generated and vibration and noise are generated due to the unnecessary forces. Meanwhile, since the magnetic shield 45 has the structure in which the above-mentioned magnetic shield 35 further includes the outer peripheral walls 45f and 45h, it may be possible to more reliably shield the magnetic flux that leaks from the magnet 20 to one side and the other side coils 14a and 14b. As a result, it may be possible to effectively solve the problems, such as the generation of unnecessary forces and vibration and noise generated due to the unnecessary forces.

Further, the motor 41 includes insulating members 36 that are provided between the disk-shaped parts 45e and 45g of the first and second shielding plates 45a and 45b and the one side and the other side coils 14a and 14b of the coil 14 covered by the disk-shaped parts 45e and 45g in the thrust direction, respectively.

As described above, the motor 41 according to another embodiment of the invention includes the rotating shaft 31 that serves as a rotation center when the rotor 11 is rotated with respect to the stator 12, the radial bearing 33 that supports the rotating shaft 31 in the circumferential direction, the thrust bearing 34 that supports one end of the rotating shaft 31 in the thrust direction, the magnet 20 that is fixed to the rotor 11 and alternately magnetized to different poles in the rotational direction of the rotating shaft 31, the core 15 that is fixed to the stator 12 and disposed to face the magnet 20 in the radial direction of the rotating shaft 31, and the coil 14 that is wound around the core 15. The magnetic center of the core 15 is offset from the magnetic center of the magnet 20 in the thrust direction, so that the rotating shaft 31 is attracted to the thrust bearing 34. Since the first and second shielding plates 45a and 45b including the disk-shaped parts 45e and 45g and the outer peripheral walls 45f and 45h, respectively, are provided as the magnetic shield 45 that shields the leakage flux leaking from the magnet 20 to the coil 14, thrust attraction is generated due to the magnetic center offset between the core 15 and the magnet 20. Therefore, a magnet as an independent and dedicated thrust-attraction member does not need to be provided. Further, it may be possible to solve a problem, which is generated due to the magnetic center offset between the core 15 and the magnet 20, by the magnetic shield 45. That is, it may be possible to reduce or prevent unnecessary forces generated due to the leakage flux that leaks from the magnet 20 to the coil 14, and unnecessary vibration and noise generated due to the unnecessary forces. Accordingly, the motor 41 according to another embodiment of the invention does not need to include a dedicated thrust-attraction magnet. As a result, it may be possible to simplify the structure, to reduce manufacturing cost, and to suppress unnecessary vibration and noise.

Further, the motor 41 according to another embodiment of the invention includes the insulating members 36 provided between the magnetic shield 45 and the coil 14. Therefore, it may be possible to more effectively shield the leakage flux leaking from the magnet 20 to the coil 14 that is a problem of the magnetic center offset causing the thrust attraction. As a result, it may be possible to reduce or prevent unnecessary forces generated due to the leakage flux, and unnecessary vibration and noise generated due to the unnecessary forces.

Meanwhile, the above-mentioned motor 41 is provided with the insulating members 36, but may not be provided with the insulating members 36 like the above-mentioned motor 1.

Further, like the motor 1, even in the above-mentioned motor 41, the magnetic shield may be provided on at least one side of the coil 14 in the thrust direction so as to cover any one side coil of the coil 14 in the thrust direction. In this case, if the magnetic shield is provided to cover one side coil of the coil 14 in the thrust direction, the magnetic shield is provided on one side where the leakage flux leaking from the magnet 20 to the coil 14 has high density, that is, on one side where the magnetic center of the magnet 20 is deviated from the magnetic center of the core, so that the magnetic shield can be further effective.

Figure 8:
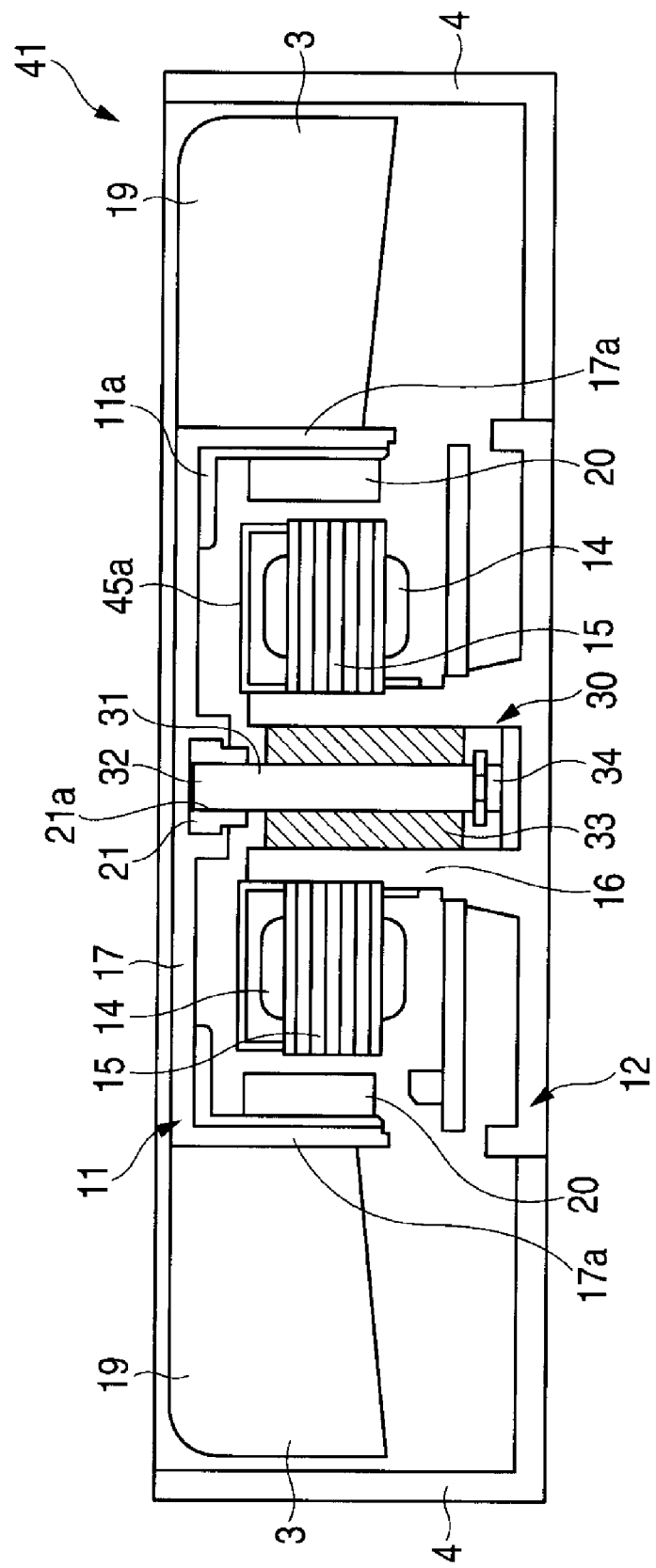
FIG. 8 is a cross-sectional view showing that the magnetic shield is provided on one side of the coil in the motor shown in FIG. 6.

That is, for example, as shown in FIG. 8, the motor according to another embodiment of the invention may be provided with the magnetic shield including the only first shielding plate 45a that is provided on one side of the coil 14 in the thrust direction so as to cover one side coil 14a of the coil 14 in the thrust direction where the leakage flux leaking from the magnet 20 to the coil 14 has high density. Since the thrust attraction is generated due to the magnetic center offset between the core 15 and the magnet 20, the motor provided with the magnetic shield that includes the only first shielding plate 45a shown in FIG. 8 does not need to include an independent and dedicated thrust-attraction member. Further, it may be possible to solve a problem generated due to the magnetic center offset by using the simple structure as compared to when the above-mentioned first and second shielding plates 45a and 45b are provided. That is, it may be possible to reduce or prevent unnecessary forces generated due to the leakage flux that leaks from the magnet 20 to the coil 14, and unnecessary vibration and noise generated due to the unnecessary forces. As a result, it may be possible to simplify the structure, to reduce manufacturing cost, and to suppress unnecessary vibration and noise. Meanwhile, the motor shown in FIG. 8 is not provided with insulating members, but may be provided with the insulating members.

In the cases of the motor 1 described with reference to FIGS. 1 and 2 and the motor 41 described with reference to FIGS. 6 and 7, the first and second shielding plates 35a, 35b, 45a, and 45b of the magnetic shields 35 and 45, which are provided on one and the other sides in the thrust direction, have been described to have a substantially symmetrical shape, but the invention is not limited thereto. For example, the motor may include the following magnetic shield 55 shown in FIG. 9.

Figure 9:
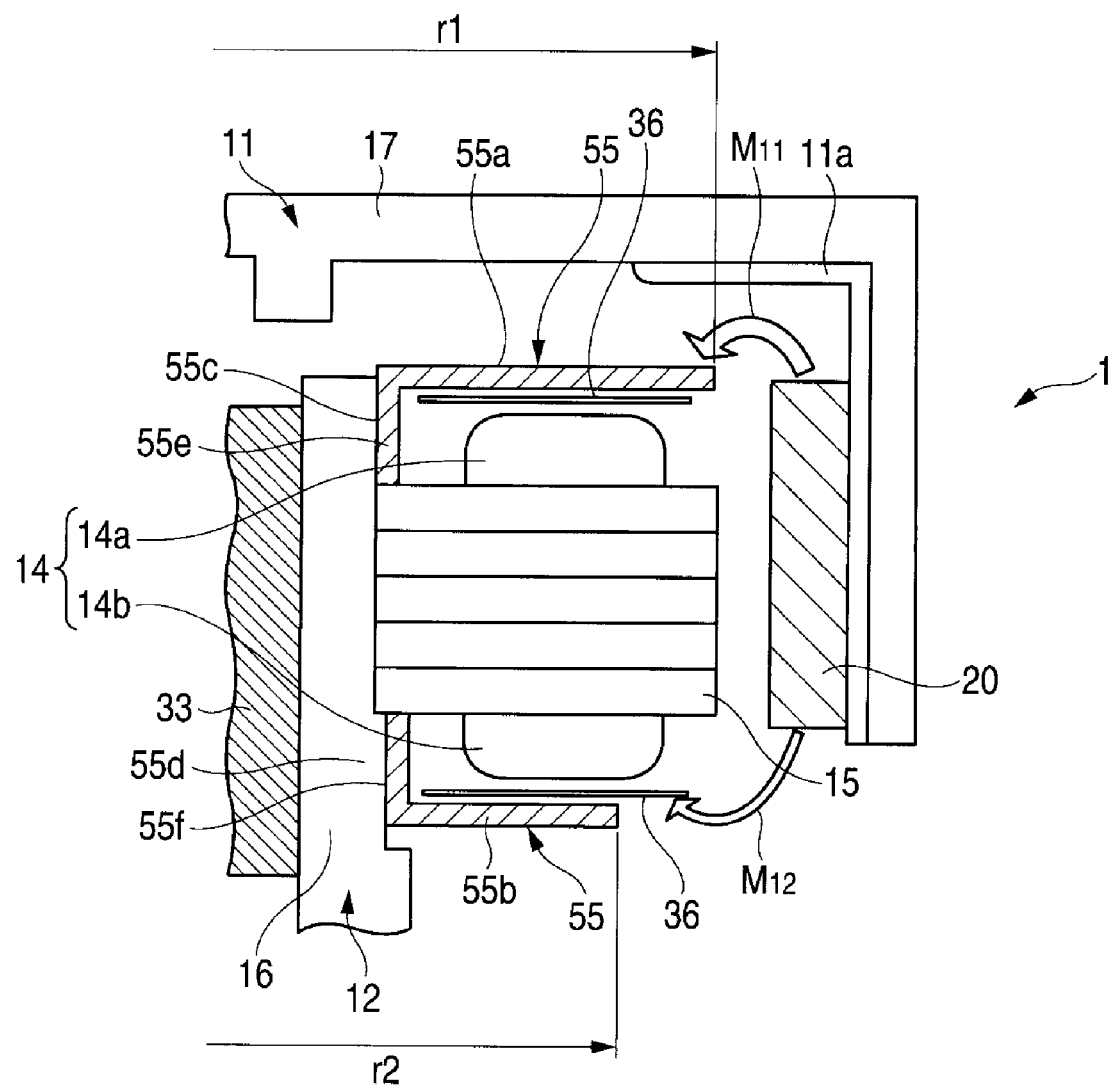
FIG. 9 is an enlarged cross-sectional view of an example of the magnetic shield of the motor according to the embodiment of the invention.

Specifically, as shown in FIG. 9, the magnetic shield 55 includes a first shielding plate 55a and a second shielding plate 55b. The first shielding plate is formed substantially in the shape of a disk so as to cover one side coil 14a of the coil 14 in the thrust direction, and is provided on one side of the coil 14 in the thrust direction. The second shielding plate is formed substantially in the shape of a disk so as to cover the other side coil 14b of the coil 14 in the thrust direction, and is provided on the other side of the coil 14 in the thrust direction.

The first shielding plate 55a has substantially the same structure as the first shielding plate 35a of the above-mentioned magnetic shield 35, and the outermost peripheral portion of the first shielding plate 55a is formed so as to be positioned inside the outer ends of the core 15.

The outermost peripheral portion of the second shielding plate 55b is formed so as to be positioned inside the outermost peripheral portion of the first shielding plate 55a. Specifically, assuming that a distance between the center of the rotating shaft 31 and the outermost peripheral portion of the first shielding plate 55a is r1 and a distance between the center of the rotating shaft 31 and the outermost peripheral portion of the second shielding plate 55b is r2, the first and second shielding plates 55a and 55b are formed so as to satisfy the relationship of "r1>r2".

Further, like the above-mentioned first and second shielding plates 35a and 35b, substantially circular insertion holes 55c and 55d into which the rotating shaft 31 is inserted are formed substantially at the central portions of the first and second shielding plates 55a and 55b, respectively, so that each of the first and second shielding plates is formed in a substantially annular shape. Furthermore, the innermost peripheral portions of the first and second shielding plates 55a and 55b are positioned at substantially the same positions as the inner ends of the core 15 or outside the inner ends of the core.

The first and second shielding plates 55a and 55b are formed as follows: the outermost peripheral portion of the first shielding plate 55a is formed so as to be positioned at substantially the same positions as the outer ends of the core 15 or inside the outer ends of the core 15, the outermost peripheral portion of the second shielding plate 55b is formed so as to be positioned inside the outermost peripheral portion of the first shielding plate 55a, and the innermost peripheral portions of the first and second shielding plates 55a and 55b are formed so as to be positioned at substantially the same positions as the inner ends of the core 15 or outside the inner ends of the core 15. Therefore, while there is no effect on the magnetic field generated by the magnet 20 that rotates the rotor 11 when drive current is supplied to the coil 14 and the above-mentioned thrust attraction, it may be possible to shield the only leakage flux leaking to the coil 14 to be described below.

The first and second shielding plates 55a and 55b include substantially the same inner peripheral walls 55e and 55f as those of the above-mentioned first and second shielding plates 35a and 35b, and are fixed to the holder 16 by the same fixing method as the method of fixing the first and second shielding plates 35a and 35b.

The magnetic flux that is generated by the magnet 20 and has an effect on the coil 14 wound around the core 15 can be lowered by shielding it by the first and second shielding plates 55a and 55b of the magnetic shield 55 due to the magnetic center offset between the core 15 and the magnet 20, and eliminate the effect. In this way, the first and second shielding plates 55a and 55b can prevent the leakage flux, which is generated by the coil 14 and the magnet 20, from crossing each other.

The magnetic shield 55, which includes the first and second shielding plates 55a and 55b, shields the leakage flux leaking from the magnet 20 to the coil 14. Therefore, the magnetic shield solves a problem generated when the magnetic center of the core 15 is offset from the magnetic center of the magnet 20 in order to generate thrust attraction, that is, a problem in that high density magnetic flux M11 and low density magnetic flux M12 contribute to one side coil 14a corresponding to one side of the core 15 in the thrust direction and the other side coil 14b corresponding to the other side thereof, respectively, so that unnecessary forces are generated and vibration and noise are generated due to the unnecessary forces.

In addition, the magnetic shield 55 does not include the outer peripheral walls 45f and 45h of the above-mentioned magnetic shield 45 described with reference to FIG. 7, and may not shield the leakage flux leaking from the magnet 20 in the radial direction. Accordingly, for example, when gaps between the first and second shielding plates 55a and 55b and the core 15 are large, it may be possible to prevent the leakage flux, which leaks in the radial direction, from becoming problematic.

That is, the magnetic shield 55 is derived from the fact that a problem is caused by the density of the leakage flux leaking from the magnet 20 to the coil 14. Further, the outermost peripheral portion of the second shielding plate 55b, which shields the other side coil 14b where the leakage flux has low density, is positioned inside the outermost peripheral portion of the first shielding plate 55a, which shields one side coil 14a where the leakage flux has high density. Accordingly, the large amount of the high density magnetic flux M11 leaking to one side coil 14a is shielded and the small amount of the low density magnetic flux M12 leaking to the other side coil 14b is shielded. As a result, the leakage flux is controlled so that the amount of the leakage flux contributing to one side and the other side coils 14a and 14b in the thrust direction becomes substantially uniform. For this reason, the unnecessary forces, which are generated in one side and the other side coils 14a and 14b, can be offset to each other as described with reference to FIGS. 16A to 16C. In other words, the magnetic shield 55 adjusts the influence of the magnet 20, which is disposed to have the magnetic center offset, on the coil 14 so that the influence of the magnet 20 on one side and the other side coils 14a and 14b are offset to each other.

The motor that is provided with the magnetic shield 55 shown in FIG. 9 includes a rotating shaft 31, a radial bearing 33, a thrust bearing 34, a magnet 20, a core 15, and coil 14, like the above-mentioned motors 1 and 41. The magnetic center of the core 15 is offset from the magnetic center of the magnet 20 in the thrust direction, so that the rotating shaft 31 is attracted to the thrust bearing 34. The motor further includes the magnetic shield 55 that shields the leakage flux leaking from the magnet 20 to the coil 14. Accordingly, the amount of the leakage flux leaking from the magnet 20 to the coil 14 is reduced, so that the generation of unnecessary forces is suppressed to the maximum extent. For example, even when it is difficult to reliably shield the leakage flux due to the shape of the coil 14 or the core 15, it may be possible to control the leakage flux so that the amount of the leakage flux leaking to one side and the other side coils 14a and 14b in the thrust direction becomes substantially uniform. For this reason, the unnecessary forces are offset to each other, so that it may be possible to reduce or prevent unnecessary vibration and noise generated due to the unnecessary forces. As a result, it may be possible to simplify the structure, to reduce manufacturing cost, and to suppress unnecessary vibration and noise.

Further, the motor that is provided with the magnetic shield 55 shown in FIG. 9 further includes the insulating members 36 provided between the magnetic shield 55 and the coil 14. Therefore, it may be possible to more effectively shield the leakage flux. As a result, it may be possible to reduce or prevent unnecessary forces generated due to the leakage flux, and unnecessary vibration and noise generated due to the unnecessary forces. Meanwhile, the motor includes the insulating members 36 in FIG. 9, but the motor may not include the insulating members 36 like the above-mentioned motor 1 even when the magnetic shield 55 is provided.

The magnetic shield of the motor according to another embodiment of the invention is not limited to the above-mentioned magnetic shields. For example, the motor may include the following magnetic shield 65 shown in FIG. 10.

Figure 10:
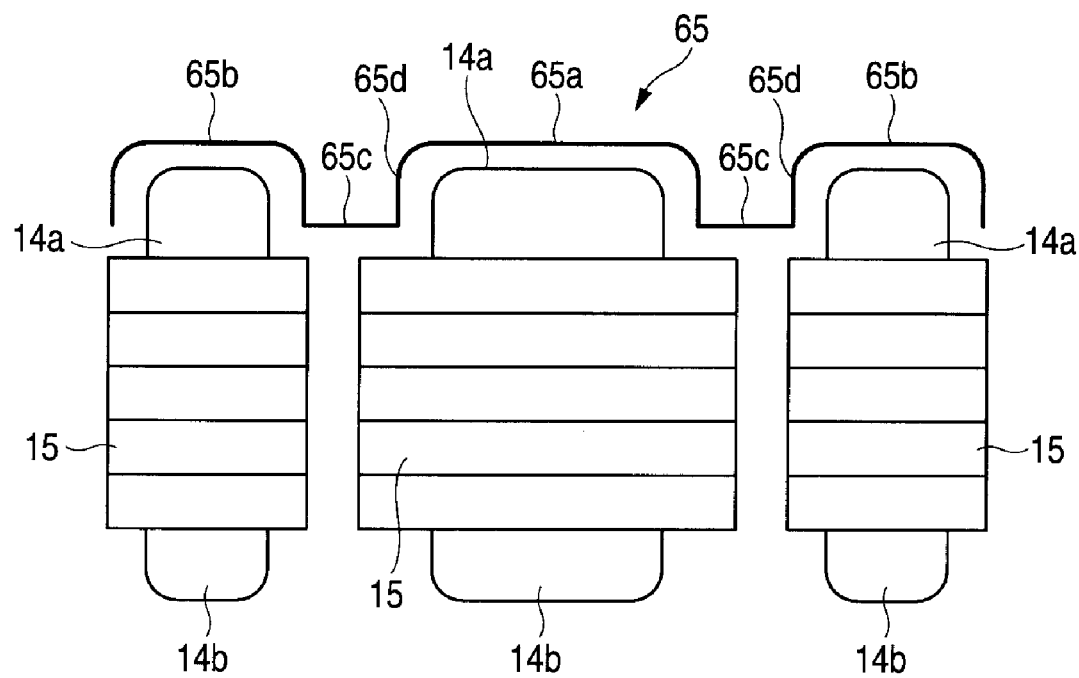
FIG. 10 is a view showing another example of the magnetic shield of the motor according to the embodiment of the invention, and is an enlarged side view of coil, a core, and a magnetic shield that are disposed from the outside of a shaft in a radial direction of the shaft.

The magnetic shield 65 shown in FIG. 10 has the shape corresponding to the concavo-convex shape of the coil 14 that are provided in the motor, and can more effectively shield the leakage flux leaking from the magnet 20 to the coil 14.

Specifically, the magnetic shield 65 includes a shielding plate 65a. The shielding plate covers one side coil 14a of the coil 14 in the thrust direction, is formed in the concavo-convex shape that has concave and convex portions corresponding to the coil provided along a circumference of the core, and is provided on one side of the coil 14 in the thrust direction. Meanwhile, the same shielding plate as the above-mentioned shielding plate may also be provided on the other side of the coil in the thrust direction as described above.

An insertion hole into which the rotating shaft 31 is inserted is formed substantially at the central portion of the shielding plate 65a so as to have a substantially circular shape as seen in the thrust direction. Accordingly, the shielding plate has the substantially annular shape as a whole as seen in the thrust direction. Further, the shielding plate is formed in the shape where protrusions 65b and recesses 65c are continuously formed by a plurality of walls 65d, which is formed in an annular shape in the radial direction thereof. The protrusions are formed at positions were one side coil 14a of the coil 14 are provided, and the recesses are formed at positions where the coil 14 are not provided.

Further, like the above-mentioned shielding plates 34a and 34b, the outermost peripheral portion of the shielding plate 65a is formed so as to be positioned at substantially the same positions as the outer ends of the core 15 or inside the outer ends of the core. Further, the innermost peripheral portion of the shielding plate is formed so as to be positioned at substantially the same positions as the inner ends of the core 15 or outside the inner ends of the core.

The magnetic flux that is generated by the magnet 20 and has an effect on the coil 14 wound around the core 15 can be lowered by shielding it by the shielding plate 65a of the magnetic shield 65 due to the magnetic center offset between the core 15 and the magnet 20, and eliminate the effect. In addition, the shielding plate 65a is formed in the shape that has the recesses 65c and the protrusions 65b so as to correspond to one side coil 14a of the coil 14. Therefore, the shielding plate can effectively shield the leakage flux, which leaks to the coil 14, at a position closer to the coil 14.

In this way, the magnetic shield 65 shields the leakage flux leaking from the magnet 20 to the coil 14. Therefore, the magnetic shield solves a problem generated when the magnetic center of the core 15 is offset from the magnetic center of the magnet 20 in order to generate thrust attraction, that is, a problem in that unnecessary forces are generated due to the magnetic flux contributing from the magnet 20 to the coil 14 and vibration and noise are generated due to the unnecessary forces.

The motor that is provided with the magnetic shield 65 shown in FIG. 10 includes a rotating shaft 31, a radial bearing 33, a thrust bearing 34, a magnet 20, a core 15, and coil 14, like the above-mentioned motors 1 and 41. The magnetic center of the core 15 is offset from the magnetic center of the magnet 20 in the thrust direction, so that the rotating shaft 31 is attracted to the thrust bearing 34. The motor further includes the magnetic shield 65 that shields the leakage flux leaking from the magnet 20 to the coil 14. Accordingly, due to the concavo-convex shape of the magnetic shield 65, the magnetic shield shields the leakage flux at a position closer to the coil 14. Therefore, the amount of the leakage flux leaking from the magnet 20 to the coil 14 is reduced, so that the generation of unnecessary forces can be effectively suppressed. For this reason, it may be possible to reduce or prevent unnecessary vibration and noise generated due to the unnecessary forces. As a result, it may be possible to simplify the structure, to reduce manufacturing cost, and to suppress unnecessary vibration and noise.

Figure 11A:
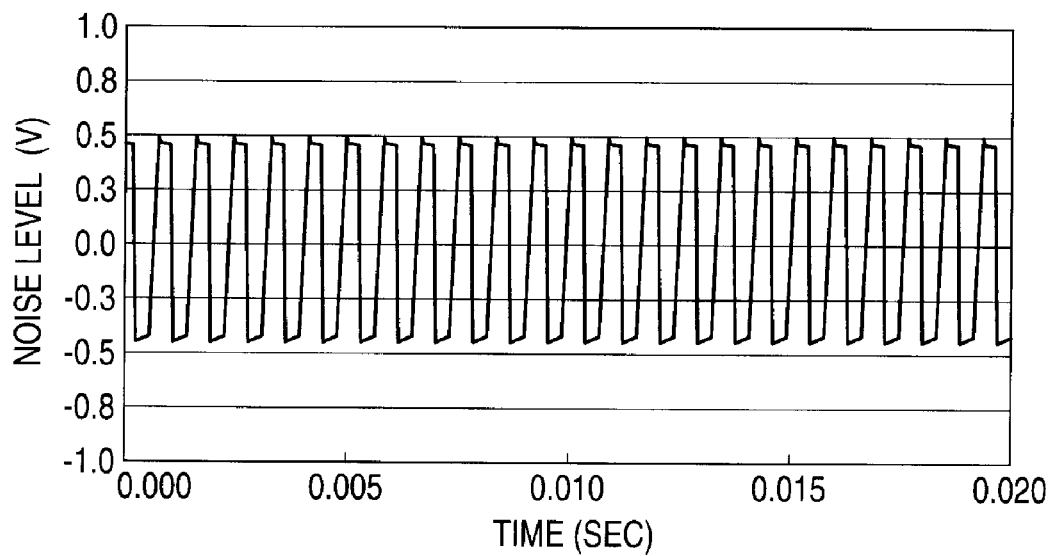
Figure 11B:
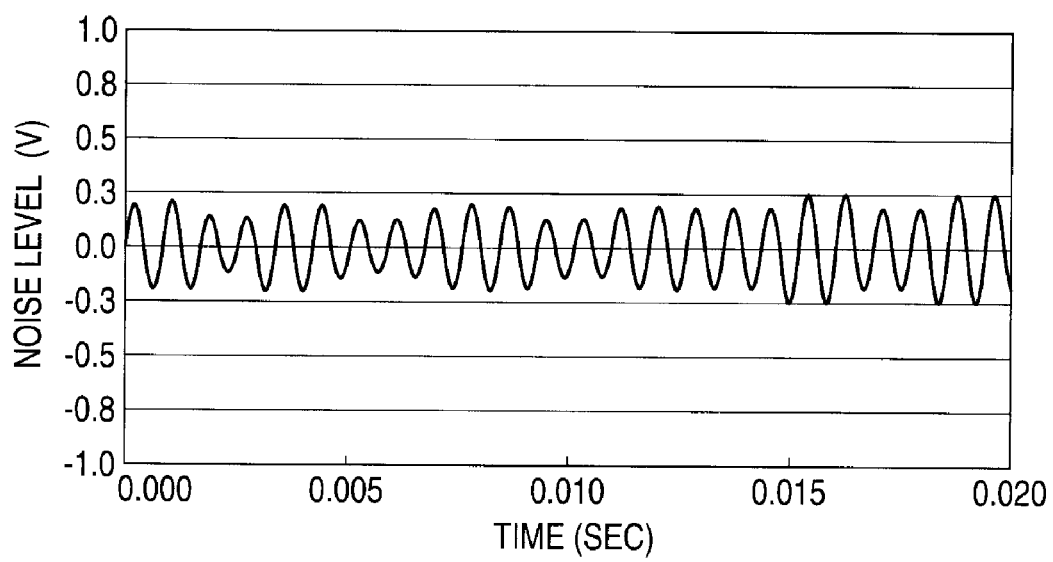
Figure 12:
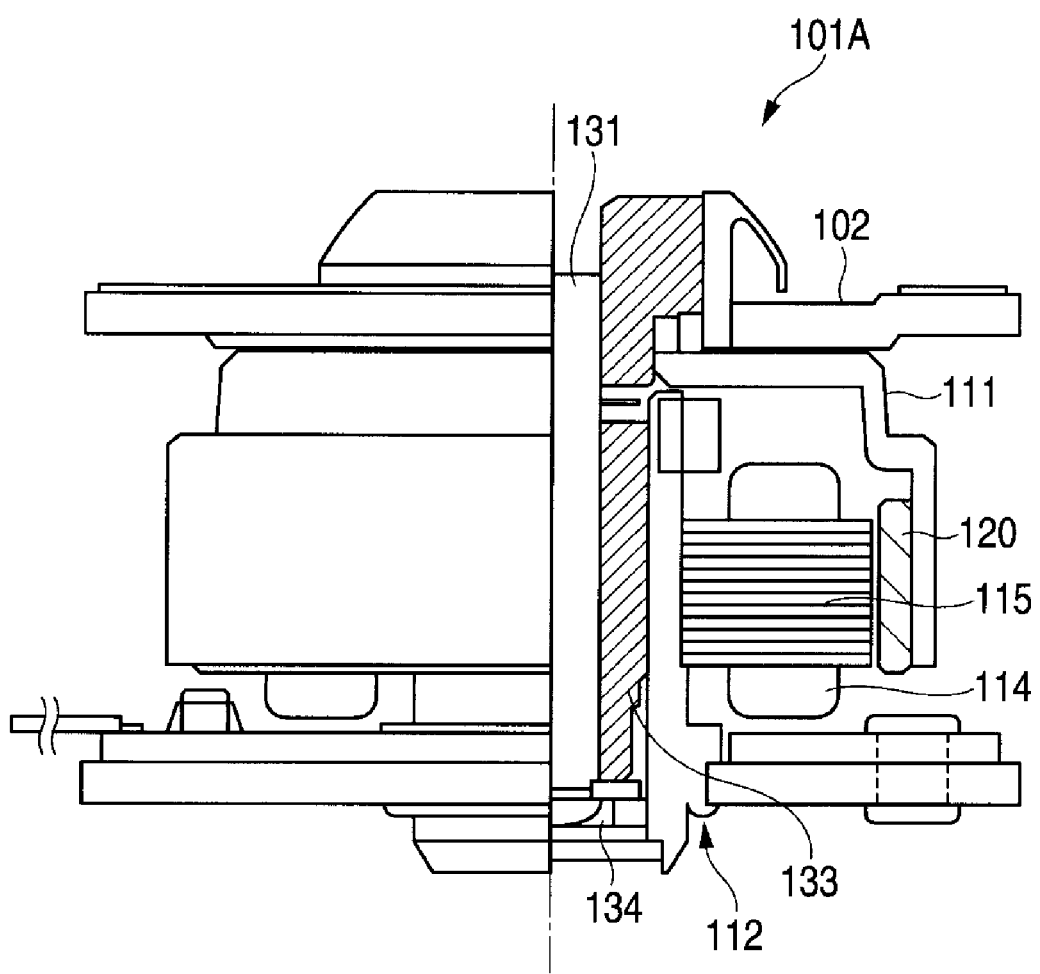
FIG. 12 is a side view and cross-sectional view of a disk spindle motor as a motor in the related art.
Figure 13:
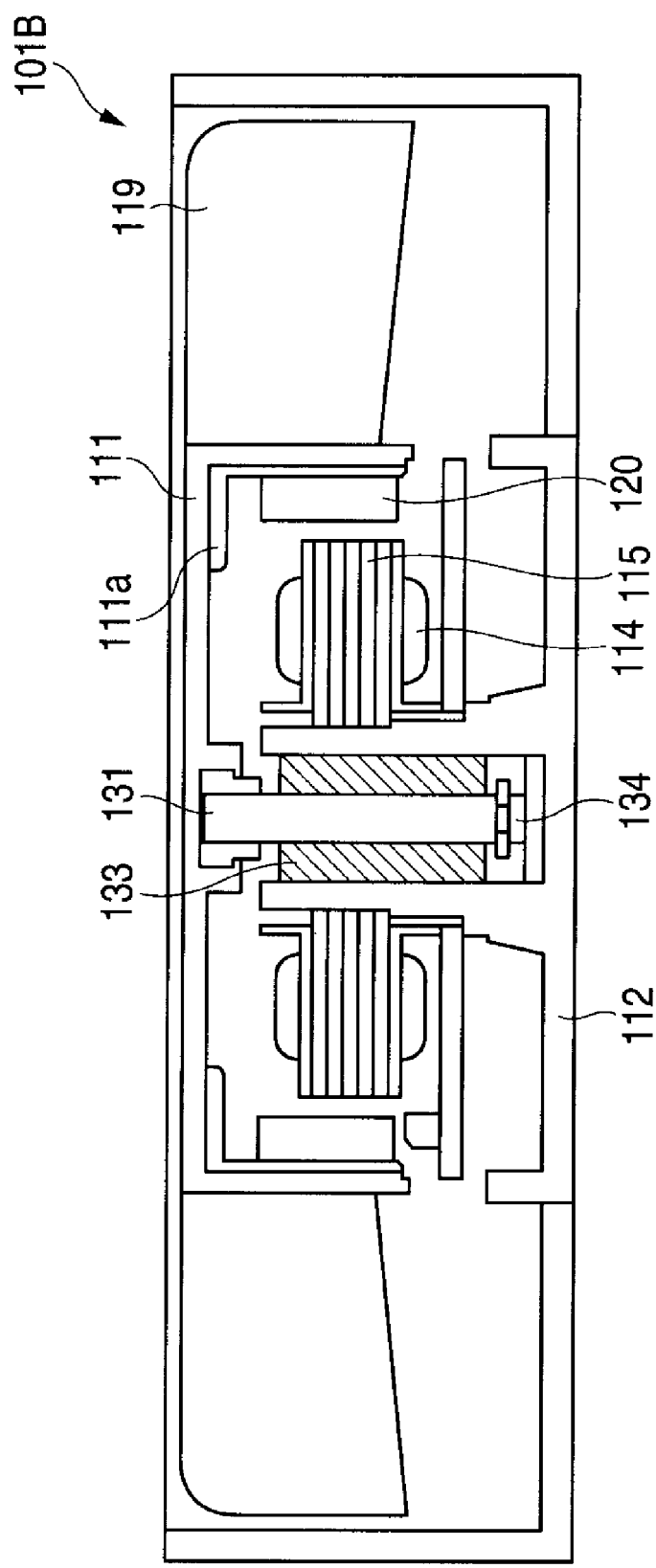
FIG. 13 is a cross-sectional view of an axial flow fan motor as a motor in the related art.
Figure 14:
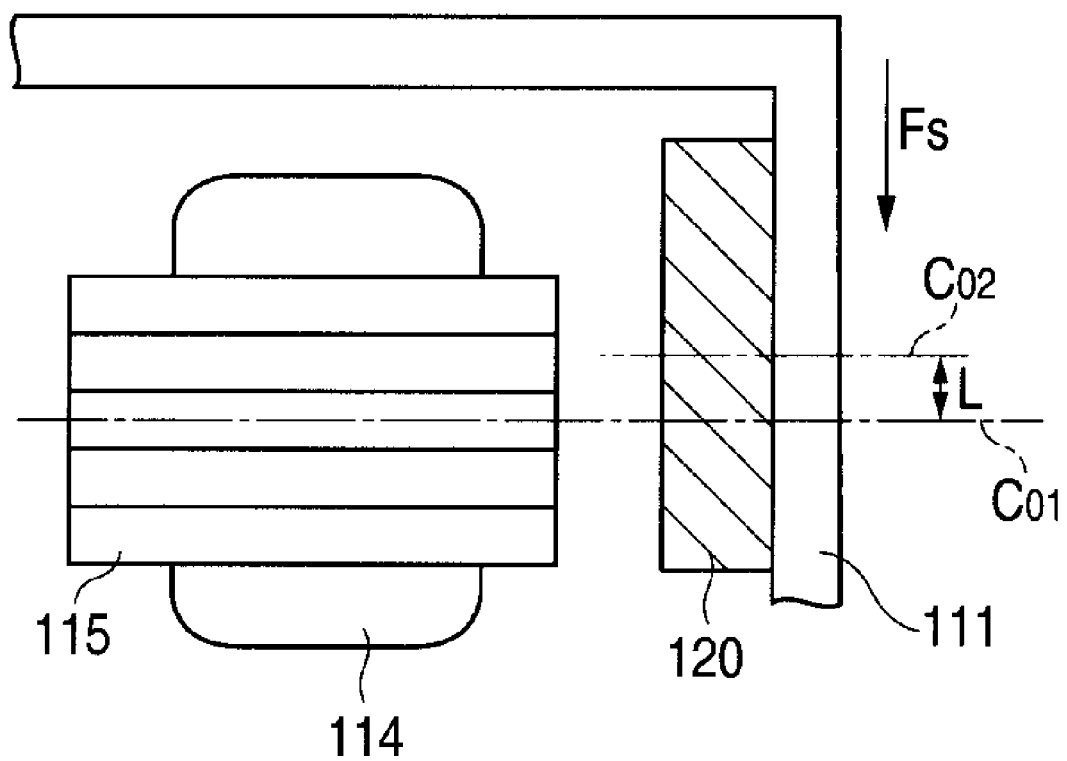
FIG. 14 is an enlarged cross-sectional view showing the positional relationship among a magnet, a coil, and a core of the motor in the related art.
Figure 17:
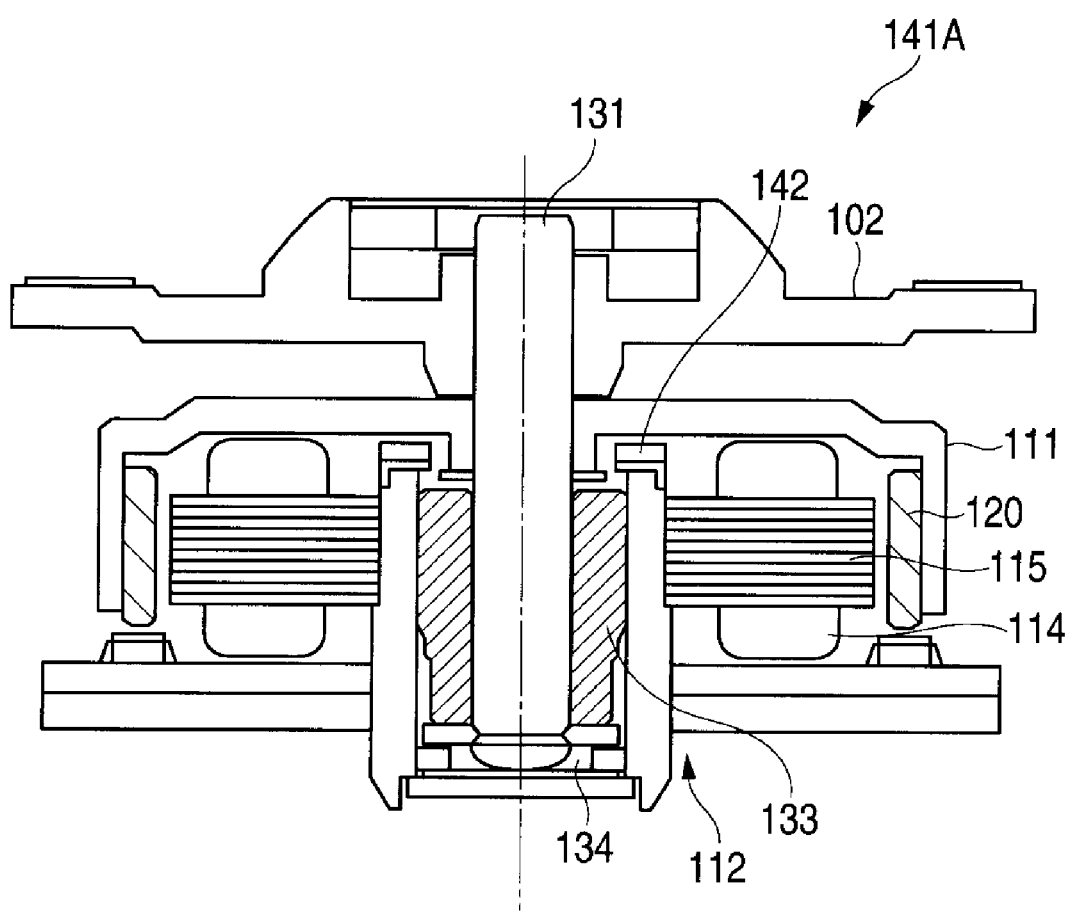
FIG. 17 is a cross-sectional view showing an example of a disk spindle motor as the motor in the related art in which a thrust-attraction magnet is provided.
Figure 18:
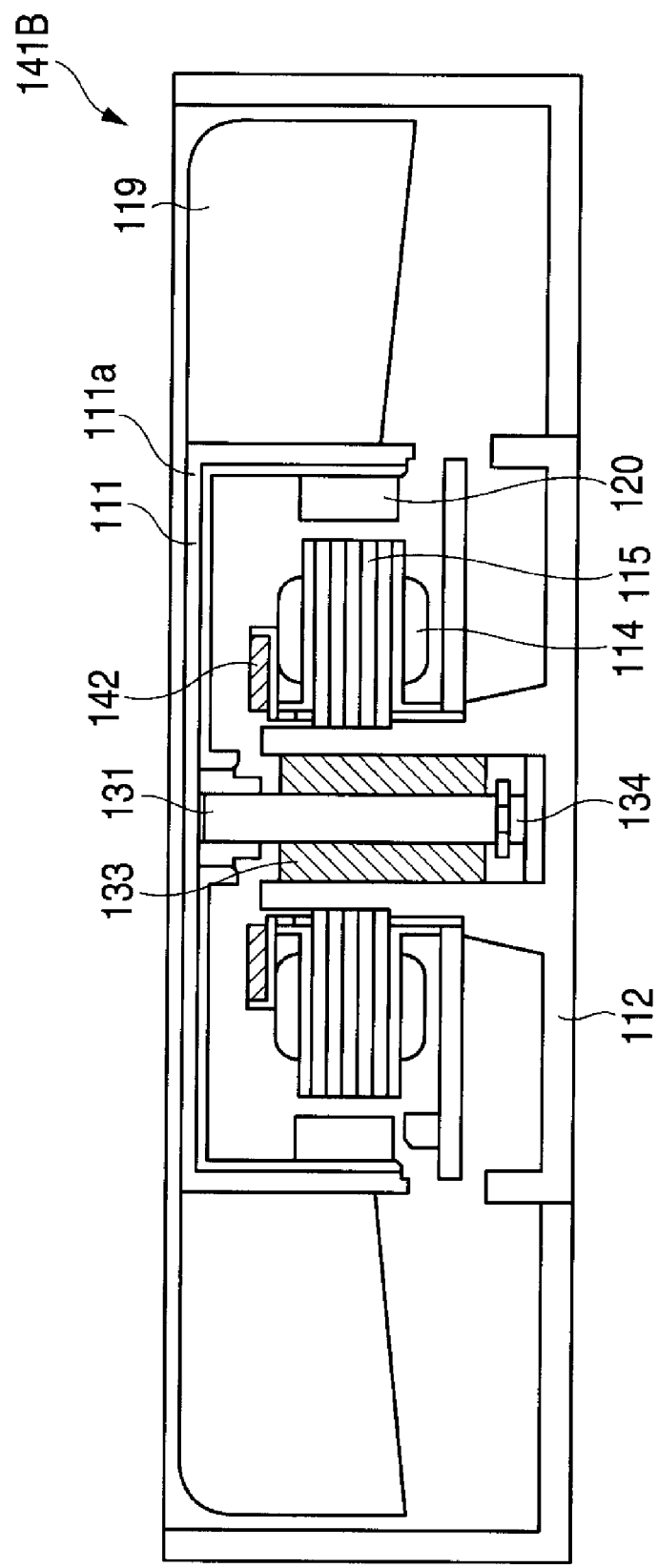
FIG. 18 is a cross-sectional view showing an example of an axial flow fan motor as the motor in the related art in which a thrust-attraction magnet is provided.
Figure 19:
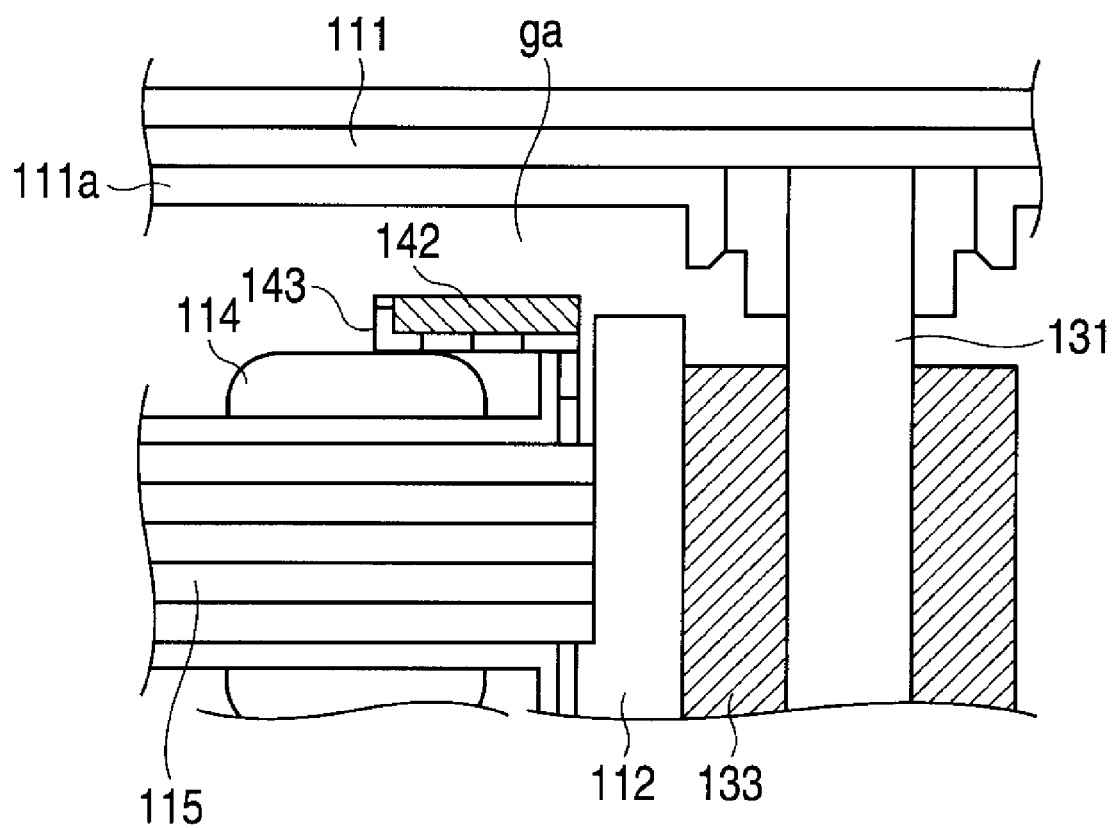
FIG. 19 is an enlarged cross-sectional view of the thrust-attraction magnet of the motor in the related art in which the thrust-attraction magnet is provided.

The motor 1 including the magnetic shield 35, which has been described with reference to FIGS. 1 and 2, among the above-mentioned magnetic shields is used as a motor according to an example. FIGS. 11A and 11B show the experimental results of the relationship between time and the change in the noise level of the motor according to the example and a motor where the only magnetic shield 35 is removed from the motor shown in FIGS. 1 and 2 (hereinafter, referred to as a "motor according to a comparative example") for the purpose of the comparison therebetween. Meanwhile, in FIGS. 11A and 11B, a horizontal axis represents the change in time (sec.), and a vertical axis represents the change in noise level (V). FIG. 11A shows the change in the noise level of the motor according to the comparative example, and FIG. 11B shows the change in the noise level of the motor according to the example of the invention.

As shown in FIG. 11B, it could be confirmed the followings: the noise level of the motor according to the example including the above-mentioned magnetic shield 35 can be about a half of the noise level of the motor according to the comparative example shown in FIG. 11A, and the vibration and noise of the motor according to the example can be suppressed.

Since the motor according to the embodiment of the invention is provided with the magnetic shield having the above-mentioned various structures as described above, it may be possible to suppress the vibration and noise while maintaining thrust attraction at low cost. Further, since the motor does not need to include an expensive dedicated thrust-attraction magnet, it may be possible to reduce cost. Furthermore, since the vibration of the motor is significantly reduced, the motor does not serve as a vibration source of a device when being built in the device. As a result, it may be possible to prevent the generation of the vibration and noise, of which expectation is difficult, of the entire device.

The motor according to the embodiment of the invention can be used as a motor of the above-mentioned heat radiator and various motors including a spindle motor of a disk drive device. In particular, the motor according to the embodiment of the invention may be the best to be used as a motor, such as a fan motor or a spindle motor, of which vibration and noise should be low.

It should be understood by those skilled in the art that various modifications, combinations, sub-combinations and alterations may occur depending on design requirements and other factors insofar as they are within the scope of the appended claims or the equivalents thereof.

What is claimed is:

1. A motor comprising:
   a shaft that serves as a rotation center when a rotor is rotated with respect to a stator;
   a bearing that supports the shaft in a circumferential direction of the shaft,
   a thrust bearing that supports one end of the shaft in a thrust direction of the shaft;
   a magnet that is fixed to the rotor and alternately magnetized to different poles in a rotational direction of the shaft;
   a core that is fixed to the stator and disposed to face the magnet in a radial direction of the shaft;
   a coil that is wound around the core and
   a magnetic shield that shields leakage flux leaking from the magnet to the coil,
   wherein a magnetic center of the core is offset from a magnetic center of the magnet in the thrust direction, so that the shaft is attracted to the thrust bearing.

2. The motor according to claim 1,
   wherein the magnetic shield is formed substantially in the shape of a disk so as to cover any one side coil of the coil in the thrust direction, and is provided on at least one side of the coil in the thrust direction.

3. The motor according to claim 2,
   wherein the magnetic shield is further provided on the other side of the coil in the thrust direction.

4. The motor according to claim 2 or 3,
   wherein the outermost peripheral portion of the magnetic shield is formed so as to be positioned at substantially the same positions as the outer ends of the core or inside the outer ends of the core.

5. The motor according to claim 2 or 3,
   wherein a substantially circular insertion hole into which the shaft is inserted is formed substantially at the central portion of the magnetic shield, and
   the innermost peripheral portion of the magnetic shield is formed so as to be positioned at substantially the same positions as the inner ends of the core or outside the inner ends of the core.

6. The motor according to claim 1,
   wherein the magnetic shield includes
   a disk-shaped part that is formed substantially in the shape of a disk so as to cover any one side coil of the coil in the thrust direction, and
   an outer peripheral wall protruding from the outermost peripheral portion of the disk-shaped part toward the core, and formed in a cylindrical shape so as to cover a part of the coil, which protrudes from the core in the thrust direction, and
   the magnetic shield is provided on at least one side of the coil in the thrust direction.

7. The motor according to claim 6,
   wherein the magnetic shield is further provided on the other side of the coil in the thrust direction.

8. The motor according to claim 6 or 7,
wherein the outermost peripheral portion of the magnetic shield is formed so as to be positioned at substantially the same positions as the ends of the core or inside the outer ends of the core.

9. The motor according to claim 6 or 7,
wherein a substantially circular insertion hole into which the shaft is inserted is formed substantially at the central portion of the magnetic shield, and the innermost peripheral portion of the magnetic shield is formed so as to be positioned at substantially the same positions as the inner ends of the core or outside the inner ends of the core.

10. The motor according to claim 1,
wherein the bearing, which supports the shaft in the circumferential direction of the shaft, is a dynamic pressure fluid bearing.

* * * * *